(12) United States Patent
Clinton

(10) Patent No.: US 8,464,227 B2
(45) Date of Patent: Jun. 11, 2013

(54) PROCESS CONTROL SCRIPT DEVELOPMENT AND EXECUTION FACILITY SUPPORTING MULTIPLE USER-SIDE PROGRAMMING LANGUAGES

(75) Inventor: Greg C. Clinton, Mission Viejo, CA (US)

(73) Assignee: Invensys Systems, Inc., Foxboro, MA (US)

( * ) Notice: Subject to any disclaimer, the term of this patent is extended or adjusted under 35 U.S.C. 154(b) by 301 days.

(21) Appl. No.: 12/886,161

(22) Filed: Sep. 20, 2010

(65) Prior Publication Data

US 2011/0099533 A1     Apr. 28, 2011

Related U.S. Application Data

(63) Continuation of application No. 10/179,624, filed on Jun. 24, 2002, now Pat. No. 7,802,238.

(60) Provisional application No. 60/300,363, filed on Jun. 2, 2001, provisional application No. 60/300,157, filed on Jun. 22, 2001, provisional application No. 60/300,400, filed on Jun. 22, 2001.

(51) Int. Cl.
*G06F 9/44* (2006.01)
*G06F 9/45* (2006.01)

(52) U.S. Cl.
USPC ............ 717/136; 717/110; 717/137; 717/139

(58) Field of Classification Search
None
See application file for complete search history.

(56) References Cited

U.S. PATENT DOCUMENTS 5,122,717 A * 6/1992 Hayashi .................. 318/569
5,168,441 A * 12/1992 Onarheim et al. ........... 700/17
5,287,449 A * 2/1994 Kojima .................... 345/161
5,392,207 A    2/1995 Wilson et al.
5,504,902 A * 4/1996 McGrath et al. ........... 717/146
5,576,946 A   11/1996 Bender et al.
5,692,198 A   11/1997 Ushiku
5,801,942 A    9/1998 Nixon et al.

(Continued)

FOREIGN PATENT DOCUMENTS

JP     11077041     7/2000
WO    9836335 A2   8/1998

OTHER PUBLICATIONS

Supplementary European Search Report for EP 02744555 dated Feb. 14, 2008.

(Continued)

*Primary Examiner* — Jason Mitchell
(74) *Attorney, Agent, or Firm* — Edward S. Jarmolowicz

(57) ABSTRACT

A supervisory process control and manufacturing information application development and execution system is disclosed that supports the execution of application object scripts derived from multiple different scripting languages. In particular, the system includes a script editor interface that enables submission/specification of scripts for application objects. The script editor interface supports multiple distinct user-side script languages (e.g., user-supplied script text). A script translation component that receives the user-side script includes routines for rendering execution-side script (executable by a script engine) from source script rendered by the script editor and written according to any of a set of user-side script languages supported by the script translation component. The translator supports at least a first scripting language and a second scripting language. Finally, an execution portion of the system includes an engine for processing the commands within the translated output execution-side script generated by the script translation component.

19 Claims, 15 Drawing Sheets

U.S. PATENT DOCUMENTS

| | | | |
|---|---|---|---|
| 5,854,930 | A | 12/1998 | McLain, Jr. et al. |
| 6,078,743 | A | 6/2000 | Apte et al. |
| 6,199,195 | B1 * | 3/2001 | Goodwin et al. ............. 717/104 |
| 6,275,868 | B1 | 8/2001 | Fraley et al. |
| 6,353,923 | B1 | 3/2002 | Bogle et al. |
| 6,385,496 | B1 | 5/2002 | Irwin et al. |
| 6,625,803 | B1 * | 9/2003 | Massena et al. ............. 717/100 |
| 6,748,585 | B2 * | 6/2004 | Proebsting et al. ........... 717/136 |
| 6,795,748 | B2 | 9/2004 | Hammer et al. |
| 2002/0091999 | A1 * | 7/2002 | Guinart ........................ 717/136 |
| 2005/0144428 | A1 * | 6/2005 | Rothman et al. .................. 713/1 |

OTHER PUBLICATIONS

Tourlas, Konstantinos "Diagrammatic Representations in Domain-Specific Languages", 2001, University of Edinburgh.

Holzner "JavaScript Complete" 1998, McGraw-Hill, pp. 13, 70, 75-78, 311-328. Retrieved from www.netlibrary.com on Jan. 5, 2006.

Maslar, Mark "PLC Standard Programming Languages: IEC 1131-3" Pulp and Paper Industry Technical Conference, 1996., Conference Record of 1996 Annual Jun. 10-14, 1996 pp. 26-31.

Lewis, R.W.; Software Instrumentation—Software Components, IEE Colloquium on Feb. 21, 1993 pp. 3/1-3/5.

Hu Yuanfang; Zhang Suqin; Jiang Weidu; Technology of Object-Oriented Languages and Systems, 1999. TOOLS 31. Proceedings Sep. 22-25, 1999 pp. 484-491.

English Translation of Second Office Action issued Sep. 24, 2012 in related Chinese Patent Application No. 2009102052314, 10 pgs.

* cited by examiner

FIG. 3

[Common Fields]

| # | Field |
|---|---|
| 300 | Scripts |
| 302 | UDA |
| 304 | Alarm Mode |
| 306 | Based On |
| 308 | AttributeNames |
| 310 | Contained Name |
| 312 | Deployed version |
| 314 | Derived from |
| 316 | Relative Execution Order |
| 318 | Hierarchial Name |
| 320 | IsTemplate |
| 322 | Alarm Inhibit |
| 324 | Alarm Mode |
| 326 | Alarm Mode Command |
| 328 | Area |
| 330 | Container |
| 332 | Category |
| 334 | Category Enum |
| 336 | Errors |
| 338 | Host |
| 340 | InAlarm |
| 342 | ScanState |
| 344 | ScanStateCommand |
| 346 | Security Group |
| 348 | Description |
| 350 | TagName |
| 352 | Warnings |

FIG. 4
[Platform Object Fields]

| | |
|---|---|
| 400 | RegisterEngine |
| 402 | StartEngine |
| 404 | StartHostedObjects |
| 406 | StopEngine |
| 408 | UnregisterEngine |
| 410 | Engines |
| 412 | EngineStates |

FIG. 5

| | |
|---|---|
| 500 | External Name |
| 502 | Internal Name |
| 504 | Reference Count |
| 506 | Objects |
| 508 | Startup Type |
| 510 | CanGoOnscan |
| 512 | BindReference |
| 514 | AutoRestart |
| 516 | CheckPointFailed |
| 518 | AlarmThrottleLimit |
| 520 | EngineAlarmRate |
| 522 | AlarmsThrottled |
| 524 | ScriptExecuteTimeout |
| 526 | ScriptStartupTimeout |
| 528 | ScriptShutdownTimeout |
| 530 | PublisherHeartbeat |
| 532 | ProcessId |
| 534 | CreateAutomationObject |
| 536 | DeleteAutomationObject |
| 538 | StartHostedObjects |

FIG. 6

| # | Field |
|---|---|
| 600 | External Name |
| 602 | Internal Name |
| 604 | StatsAvgPeriod |
| 606 | CheckpointPeriodAvg |
| 608 | ExecutionTimeAvg |
| 610 | HousekeepingTimeAvg |
| 612 | TimeIdleAvg |
| 614 | TimeIdleMax |
| 616 | TimeIdleMin |
| 618 | InputMsgSizeAvg |
| 620 | InputMsgsProcessedAvg |
| 622 | InputMsgsQueuedAvg |
| 624 | InputMsgsQueuedMax |
| 626 | InputQueueSizeAllowed |
| 628 | InputQueueSizeAvg |
| 630 | InputQueueSizeMax |
| 632 | TimeInputAvg |
| 634 | ObjectCnt |
| 636 | ObjectsOffScanCnt |
| 638 | TimeOutputAvg |
| 640 | StatsReset |
| 642 | ScanCyclesCnt |
| 644 | ScanOverrunsCnt |
| 646 | ScanOverrunsConsecutiveCnt |
| 648 | ScanOverrunHighLimit |
| 650 | ScanOverrunCondition |
| 652 | ScanPeriod |

FIG. 7

[Analog Device Application Object Fields]

| # | Field |
|---|---|
| 700 | AnalogDevice Attributes |
| 701 | PV.Input |
| 702 | PV. Output |
| 703 | Scaling |
| 704 | LevelAlarms |
| 705 | PV.Roc |
| 706 | SP |
| 707 | PVDev |
| 708 | CtrlTrack |

Area (Model)

Derivation (App. Objects)

Model (Compound Containment)

Physical Hardware Derivation View

Application Model View

Deployment View

PROCESS CONTROL SCRIPT DEVELOPMENT AND EXECUTION FACILITY SUPPORTING MULTIPLE USER-SIDE PROGRAMMING LANGUAGES

CROSS REFERENCE TO RELATED APPLICATIONS

This application claims priority of Clinton, U.S. patent application Ser. No. 10,179,624, filed on Jun. 24, 2002, entitled "Process Control Script Development And Execution Facility Supporting Multiple User-Side Programming Languages," which claims the priority of Resnick et al. U.S. provisional application Ser. No. 60/300,363 filed on Jun. 22, 2001, entitled "An Object-based Architecture for Executing Supervisory Process Control and Manufacturing Applications," Resnick et al. U.S. provisional application Ser. No. 60/300,157 filed on Jun. 22, 2001, entitled "Method and System for Enhancing Engineering Productivity in Developing Supervisory Control and Manufacturing Information Applications," and Clinton U.S. provisional application Ser. No. 60/300,400 filed on Jun. 22, 2001, entitled "A Scripting Paradigm For Supervisory Process Control and Manufacturing Information Applications." The contents of each above identified provisional and/or patent application are expressly incorporated herein by reference in their entirety including the contents and teachings of any references contained therein.

FIELD OF THE INVENTION

The present invention generally relates to the field of computerized process control networks. More particularly, the present invention relates to supervisory process control and manufacturing information systems. Such systems generally execute above a control layer in a process control network to provide guidance to lower level control elements such as, by way of example, programmable logic controllers.

BACKGROUND OF THE INVENTION

Significant advances in industrial process control technology have vastly improved all aspects of factory and plant operation. Before the introduction of today's modern industrial process control systems, industrial processes were operated/controlled by humans and rudimentary mechanical controls. As a consequence, the complexity and degree of control over a process was limited by the speed with which one or more people could ascertain a present status of various process state variables, compare the current status to a desired operating level, calculate a corrective action (if needed), and implement a change to a control point to affect a change to a state variable.

Improvements to process control technology have enabled vastly larger and more complex industrial processes to be controlled via programmed control processors. Control processors execute control programs that read process status variables, execute control algorithms based upon the status variable data and desired set point information to render output values for the control points in industrial processes. Such control processors and programs support a substantially self-running industrial process (once set points are established).

Notwithstanding the ability of industrial processes to operate under the control of programmed process controllers at previously established set points without intervention, supervisory control and monitoring of control processors and their associated processes is desirable. Such oversight is provided by both humans and higher-level control programs at an application/human interface layer of a multilevel process control network. Such oversight is generally desired to verify proper execution of the controlled process under the lower-level process controllers and to configure the set points of the controlled process.

Manufacturing/process control systems are modified due to changes in the process control devices and the processes themselves. Thus, it is important in such instances to provide a means for quickly configuring/re-configuring without touching unchanged portions of the system. It is also important to provide a means for making such changes while minimizing disruptions to the operation of the industrial process—e.g., minimizing the time that the process stands idle.

In view of the interest and desirability to continually improve supervisory process control and manufacturing information systems, there is a strong desire to not be locked into a single architecture for a supervisory process control and manufacturing information system. Process control systems change, and it is desirable to have higher level systems that adapt to such changes regardless of their magnitude. Furthermore, less flexible supervisory process control and manufacturing information system offerings require designers of process control installations to take into consideration the long-term requirements of an application because of the relative inflexibility of the application to modifications once it is installed.

However, such application inflexibility is undesirable in the conservative industrial control systems market. The process control industry tends to pilot, and often the designers are not fully aware of the full extent and form of the automation that will ultimately be incorporated in a final installation. Later in the life of a plant, when new functionality is added the new control system components leverage or merge existing systems. In such instances where the process control system has changed significantly, there are advantages to incorporating a different architecture into the installed supervisory process control application.

Another aspect to a flexible architecture for an supervisory process control and manufacturing information application is the need to enable customers to design and the implement on their own, customized applications and even the objects that are incorporated into the applications. The set of various types of systems wherein the supervisory process control applications are incorporated is virtually limitless. A provider of supervisory process control applications cannot possibly develop all types of objects/components to support every potential use of the application by customers. Nor can the provider possibly possess sufficient knowledge of the particular control needs of each customer. Thus, customers need to configure (or commission another to configure), to a certain extent, their own customized application objects to meet the specific needs of a particular application. The customers are in the best position to know what features they need in their supervisory level control applications. The challenge to the supplier of supervisory level application software/systems is to enable the customers (or third parties) to efficiently and quickly design and implement customized applications meeting the customers' particular needs.

In the course of designing their own applications and components thereof, customers, and their code developers augment base software components with additional software instructions to render customized executable applications. One such way to augment software is through the integration of scripts into existing object packages. Scripts, in general, are simple, interpreted, text-based program instructions that bridge the gap between functionality provided in a base system and its associated development tools, and a desired customized system configured for a particular process control application. Such scripts have been used in the form of macros to extend application functionality and to integrate external applications and databases.

Scripts are utilized in a variety of areas of process control and manufacturing information application components. A non-exhaustive list of such areas include: supervisory process control, batch control, alarm detection, database maintenance, and report generation. A variety of scripting languages are known that are utilized to implement scripts for carrying out augmentation and integration of base software in the above-identified areas. Furthermore, some scripting languages are better suited to certain areas than others, and programmers tend to acquire script programming skills based upon the area in which they practice. Thus, development and runtime environments for supervisory process control and manufacturing information applications that support only a single scripting language potentially impose a burden upon customers, and developers that customize such systems, to acquire new skills to program scripts that really aren't well suited for a particular integration/augmentation task.

SUMMARY OF THE INVENTION

In accordance with the present invention a supervisory process control and manufacturing information application development and execution system supports the execution of application object scripts derived from multiple different scripting languages. In particular, the system includes a script editor interface that enables submission/specification of scripts for application objects. The script editor interface supports multiple distinct user-side script languages (e.g., user-supplied script text). A script translation component that receives the user-side script includes routines for rendering execution-side script (executable by a script engine) from source script rendered by the script editor and written according to any of a set of user-side script languages supported by the script translation component. The translator supports at least a first scripting language and a second scripting language. Finally, an execution portion of the system includes an engine for processing the commands within the translated output execution-side script generated by the script translation component.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 depicts a set of attributes associated with a common portion for the objects comprising the application;

FIG. 4 depicts a set of attributes associated with a platform-specific portion of a platform object;

FIG. 5 depicts a set of attributes associated with an engine object;

FIG. 6 depicts a set of attributes associated with a scheduler object;

FIG. 7 depicts a set of attributes associated with an exemplary application object;

DETAILED DESCRIPTION OF AN ILLUSTRATIVE EMBODIMENT

Figure 1:
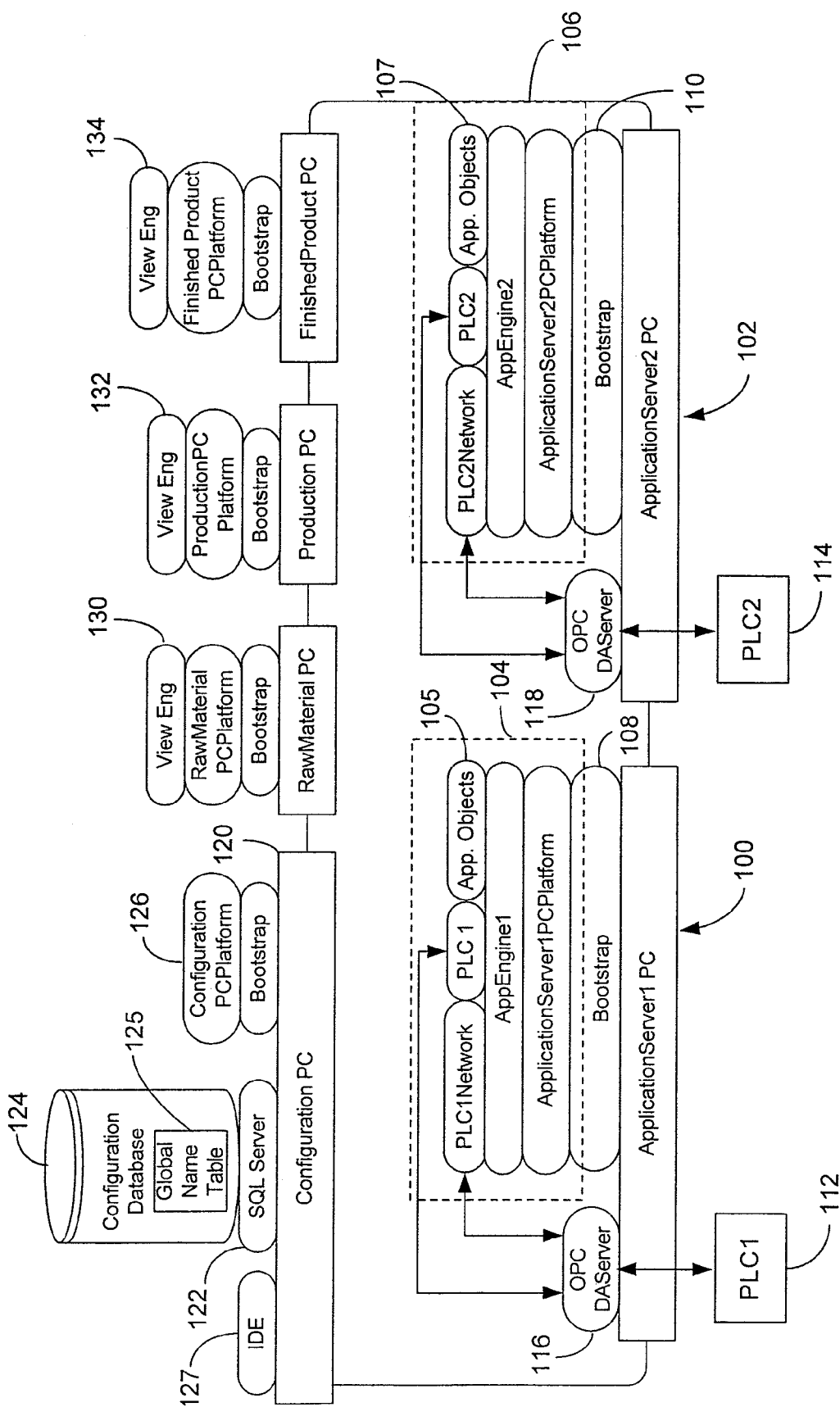
FIG. 1 is a schematic diagram of an exemplary supervisory process control network including a multi-layered supervisory process control and manufacturing information application.

In view of the shortcomings of known supervisory process control applications with regard to adapting to changed process control system architectures, a supervisory process control and manufacturing information system application architecture is described that offers users the freedom to re-architect (e.g., augment, reconfigure, etc.) such applications, with minimal impact on the existing, underlying, process control system engineering. In particular, the disclosed system architecture, described by way of example herein, comprises multiple layers wherein each underlying layer exhibits a hosting relationship to a next higher layer. It is noted however, that such hosting relationship does not extend to communications, and thus communications to/from a hosted layer need not pass through its host. In accordance with the disclosed layered application architecture, an application object is hosted by an engine. The engine is hosted by a platform that corresponds to, for example, a personal computer with infrastructure software. The intermediate engine layer abstracts the application object from the platform architecture. Thus, location within a physical system containing the application object need not be addressed by the application object.

One aspect of the disclosed supervisory process control and manufacturing information application is an object hierarchy that frees high level application objects of design constraints associated with the computing system hardware upon which the application objects reside. In particular, the objects associated with a supervisory process control application environment are arranged on physical computing devices in a hierarchy comprising a plurality of layers. Application objects execute at an application layer. The application objects are hosted by an engine object at a middle layer. The engine objects are hosted by a platform object that resides at the lowest of the three layers. Each platform object, launched by a bootstrap object at yet an even lower layer. The platform object corresponds a physical computing system (including an operating system) upon which application and engine objects execute. Thus, application objects need only establish a proper, standardized, relationship to a hosting application engine object. Aspects of the supervisory control and manufacturing information system relating to physical computing devices and their operating systems are handled by the engine and platform object configuration. The physical topology of the system and the application's physical location is transparent to the operation of the application objects.

The disclosed layered hosting arrangement of object enables a supervisory process control application to be modeled independently of the computing hardware and supervisory control network topology, upon which the application executes. Isolating the application model from the physical deployment configuration enables migrating applications to new/different computing systems as the need arises and to keep up with underlying hardware changes over the course of the life of the application. Such capabilities are especially beneficial in the area of process control and manufacturing information systems where pilot installations are used to provide proof of concept and then the application grows as, and when, it is justified.

The application model includes groupings of application objects within logical containers referred to as "areas." All application objects within a same area must be deployed upon a same application engine according to a software deployment scheme. However, the layered application architecture enables binding an application model to a particular deployment model at a late stage in development. Thus, an abstract "area" need not be associated with a particular engine until a developer is ready to deploy and execute a supervisory-level system.

The security model for a supervisory control and manufacturing information system is independent of the physical hardware, and thus a supervisory process control and manufacturing information system architect need not bind security to a particular physical system component until the application modules have been deployed within a physical system containing the physical system component. The late binding of security to particular components of a system enables a developer to determine the authorization of a particular system based upon the deployed application objects, and the developer binds security based upon the functionality of the application objects deployed upon particular computing nodes.

Furthermore, disassociating the functionality (business logic) provided by the application objects from the computer systems upon which the execute enables presenting the defined system/software configuration according to a plurality of views/models. A "plant centric" application model enables a system developer to build an application model in a logical way. The system developer defines the individual devices and functions as distinct entities within a plant. All associated functionality is contained in each object. After defining the individual objects within the plant, the user configures (assembles) associations between the objects.

The application model is a logical build of the plant relative to physical areas of the plant and the equipment and functions within the physical areas. The engineer configures the behavior and association between these plant area entities. The supervisory process control and manufacturing information system provides a configuration view of the application model depicting a containment hierarchy with relation to: the areas and equipment, and the equipment itself.

The application model supports containing objects within objects, and containment can be specified in a template. Containment facilitates leveraging the work of different engineers at different levels of development of a supervisory process control and manufacturing information application. A particular technician can define the details for a particular low level device. Thereafter another engineer defines a unit or other device in the application that contains one or more instances of the particular low level device.

The application model also supports propagating changes through inheritance. Thus, child objects inherit changes to a referenced parent template definition.

After a developer specifies the functionality of a process control and manufacturing information application, the application is deployed across potentially many physical computing systems. In an embodiment of the invention disclosed herein, a second type of system view, referred to as a deployment model, enables a user to configure physical PCs and devices with regard to an application. The deployment model defines: PCs and engine types that run on the platforms, and external device integration. A user defines the areas that will run on particular engines, thereby determining where the particular application software will be physically executed. The supervisory process control and manufacturing information system provides a configuration view of a deployment model showing the hierarchy with physical PCs, and the areas and application objects running on the physical PCs. After a developer designates/confirms the deployment model, the application objects and engine objects are deployed on the physical computing devices according to the deployment model.

Other aspects of an embodiment of an application embodying the present relate to the manner in which it is developed. In particular, rather than programming an application from scratch. The supervisory process control and manufacturing information application is developed using a set of provided tools, templates, configuration interfaces and automated code generators. In particular, an exemplary application development environment includes templates and the ability to build objects from the templates. Instances are then created from the created objects. Thus, developers import a particular object template from a library of standard templates as a starting point for an application development project. Using the templates, application developers duplicate previously created objects inside of a project.

Another feature of the development environment is the ability of third parties to develop custom templates using template development toolkits. The customized templates are then integrated into the development environment. The toolkits provide the basic required functionality for particular types of objects. The third parties define additional functionality that augments the base functionality supplied by the toolkits.

Yet another feature of the development environment is the multi-functionality of the developed objects. In particular, a user develops/configures a single unit (object). However, the single unit supports a variety of environments including: an editor environment, a package management environment, and a runtime environment.

Another aspect of the template architecture is the incorporation of graphics into the templates. Thus, the graphic/symbol of an object is a part of the object. The graphical attributes of the object follow the object and can be inherited by templates derived from the template.

In accordance with another aspect of an embodiment of the present invention, a set of user-side scripting languages are translated down to a smaller set of execution-side scripting languages (and preferably a single execution-side scripting language). It is also contemplated that one or more of the set of user-side scripting languages can overlap with the set of execution-side scripting languages.

Having summarized generally the new architecture for a supervisory process control and manufacturing information system facilitating re-configuring (re-architecting) the system, attention is directed to FIG. 1, comprising an illustrative example of a system incorporating an application architecture embodying the present invention. A first application server personal computer (PC) 100 and a second application server PC 102 collectively and cooperatively execute a distributed multi-layered supervisory process control and manufacturing information application comprising a first portion 104 and second portion 106. The application portions 104 and 106 include device integration application objects PLC1 Network and PLC1, and PLC2Network and PLC2, respectively. The PLCxNetwork device integration objects facilitate configuration of a data access server (e.g., OPC DAServers 116 and 118). The PLC1 and PLC2 device integration objects, operating as OPC clients, access data locations within the buffers of the OPC DAServers 116 and 118. The data access servers 116 and 118 and the device integration objects cooperatively import and buffer data from external process control components such as PLCs or other field devices. The data buffers are accessed by a variety of application objects 105 and 107 executing upon the personal computers 100 and 102. Examples of application objects include, by way of example, discrete devices, analog devices, field references, etc.

In accordance with an embodiment of the present invention, application engines host the application objects (via a logical grouping object referred to herein as an "area". The engines are in turn hosted by platform objects at the next lower level of the supervisory process control and manufacturing information application. The application portions 104 and 106 are, in turn hosted by generic bootstrap components 108 and 110. All of the aforementioned components are described herein below with reference to FIG. 2.

In the exemplary system embodying the present invention, the multi-layered application comprising portions 104 and 106 is communicatively linked to a controlled process. In particular, the first application server personal computer 100 is communicatively coupled to a first programmable logic controller 112, and the second application server personal computer 102 is communicatively coupled to a second programmable logic controller 114. It is noted that the depicted connections from the PCs 100 and 102 to the PLCs 112 and 114 represent logical connections. Such logical connections correspond to both direct and indirect physical communication links. For example, in a particular embodiment, the PLC 112 and PLC 114 comprise nodes on an Ethernet LAN to which the personal computers 100 and 104 are also connected. In other embodiments, the PLCs 112 and 114 are linked directly to physical communication ports on the PCs 100 and 102.

In the illustrative embodiment set forth in FIG. 1, the PCs 100 and 102 execute data access servers 116 and 118 respectively. The data access servers 116 and 118 obtain/extract process information rendered by the PLC's 112 and 114 and provide the process information to application objects (e.g., PLC1Network, PLC1, PLC2Network, PLC2) of the application comprising portions 104 and 106. The data access servers 116 and 118 are, by way of example, OPC Servers. However, those skilled in the art will readily appreciate the wide variety of custom and standardized data formats/protocols that are potentially carried out by the data access servers 116 and 118. Furthermore, the exemplary application objects, through connections to the data access servers 116 and 118, represent a PLC network and the operation of the PLC itself. However, the application objects comprise a virtually limitless spectrum of classes of executable objects that perform desired supervisory control and data acquisition/integration functions in the context of the supervisory process control and manufacturing information application.

The supervisory process control and management information application is augmented, for example, by a configuration personal computer 120 that executes a database (e.g., SQL) server 122 that maintains a supervisory process control and management information application configuration database 124 for the application objects and other related information including templates from which the application objects are rendered. The configuration database 124 also includes a global name table 125 that facilitates binding location independent object names to location-derived handles facilitating routing messages between objects within the system depicted in FIG. 1. The configuration PC 120 and associated database server 122 support: administrative monitoring for a multi-user environment, revision history management, centralized license management, centralized object deployment including deployment and installation of new objects and their associated software, maintenance of the global name table 125, and importing/exporting object templates and instances.

Actual configuration of the applications is carried out via an Integrated Development Environment (IDE) 127 that communicates with the database server 122 via distributed component object model (DCOM) protocols. The IDE is a utility from which application objects are configured and deployed to the application server PCs 100 and 102. Developers of a supervisory process control and manufacturing information application, through the IDE, carry out a wide variety of system design functions including: importing new object and template types, configuring new templates from existing templates, defining new application objects, and deploying the application objects to the host application engines (AppEngine1 or AppEngine2 in FIG. 1) on the application server PCs 100 and 102.

The exemplary supervisory control network environment depicted in FIG. 1, also includes a set of operator stations 130, 132, and 134 that provide a view into a process or portion thereof, monitored/controlled by the supervisory process control and management information application installed and executing as a set of layered objects upon the PCs 100 and 102. A RawMaterial PC 130 provides a representative view enabling monitoring a raw materials area of a supervised industrial process. A ProductionPC 132 presents a representative view of a production portion of the supervised industrial process. A FinishedProductPC 134 provides a representative view of an area of a production facility associated with finished product. Each one of the operator stations 130, 132, and 134 includes a bootstrap host for each of the particular operator station platforms. Each one of the operator stations 130, 132, and 134 includes a view engine that process graphics information to render a graphical depiction of the observed industrial process or portion thereof It is noted that the system depicted in FIG. 1 and described hereinabove is merely an example of a multi-layered hierarchical architecture for a supervisory process control and manufacturing information system. The present invention is not limited to the particular disclosed application/system. For example it is contemplated that the multi-layered application approach is applicable, at a lower control level, to a distributed control system (DCS) application or a programmable logic controller (PLC) application. In these cases specific platform and application engine objects are developed for the unique computing hardware within the DCS or PLC. It is further noted that FIG. 1 is presented as a logical view of the interrelations between installed software and physical computing hardware and is not intended to designate any particular network topology. Rather the present invention is suitable for a virtually any network topology. In fact, the present invention is applicable to a control application running on a single computer system linked to a controlled process.

Figure 2:
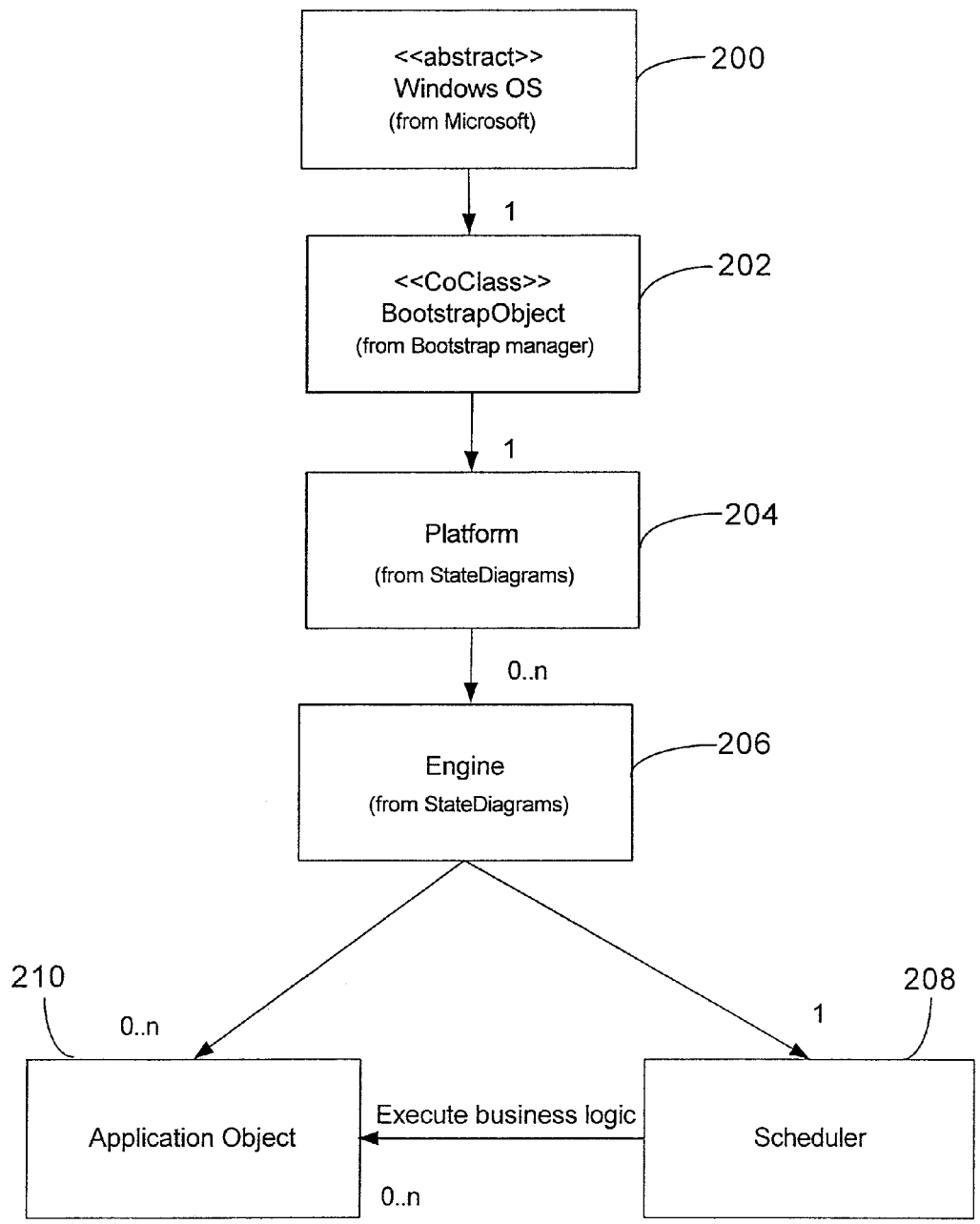
FIG. 2 depicts a multi-tiered object arrangement for an application.

Turning now to FIG. 2, a class diagram depicts the hierarchical arrangement of layered software associated with a computer executing at least of portion of a supervisory process control and manufacturing information application. Each computer executes an operating system 200, such as MICROSOFT's WINDOWS at a lowest level of the hierarchy. The operating system 200, hosts a bootstrap object 202. The bootstrap object 202 is loaded onto a computer and activated in association with startup procedures executed by the operating system 200. As the host of a platform class object 204, the bootstrap object 202 must be activated before initiating operation of the platform class object 204. The bootstrap object 202 starts and stops the platform class object. The bootstrap object 202 also renders services utilized by the platform class object 204 to start and stop one or more engine objects 206 hosted by the platform class object 204.

The platform class object 204 is host to one or more engine objects 206. In an embodiment of the invention, the platform class object 204 represents, to the one or more engine objects 206, a computer executing a particular operating system. The platform class object 204 maintains a list of the engine objects 206 deployed on the platform class object 204, starts and stops the engine objects 206, and restarts the engine objects 206 if they crash. The platform class object 204 monitors the running state of the engine objects 206 and publishes the state information to clients. The platform class object 204 includes a system management console diagnostic utility that enables performing diagnostic and administrative tasks on the computer system executing the platform class object 204. The platform class object 204 also provides alarms to a distributed alarm subsystem.

The engine objects 206 host a set of application objects 210 that implement supervisory process control and/or manufacturing information acquisition functions associated with an application. The engine objects 206 initiate startup of all application objects 210. The engine objects 206 also schedule execution of the application objects 210 with regard to one another with the help of a scheduler object. Engines register application objects with a scheduler for execution. The scheduler executes the application objects relative to other application objects based upon the configuration specified by an engine. The engine objects 206 monitor the operation of the application objects 210 and place malfunctioning ones in a quarantined state. The engine objects 206 support check pointing by saving/restoring changes to a runtime application made by automation objects to a configuration file. The engine objects 206 maintain a name binding service that bind attribute references (e.g., tank1.value.pv) to a proper one of the application objects 210.

The engine objects 206 ultimately control how execution of application objects will occur. However, once the engine objects 206 determine execution scheduling for application objects 210, the real-time scheduling of their execution is controlled by a scheduler 208. The scheduler supports an interface containing the methods RegisterAutomationObject( ) and UnregisterAutomationObject( ) enabling engine objects 206 to add/remove particular application objects to/from the schedulers list of scheduled operations.

The application objects 210 include a wide variety of objects that execute business logic facilitating carrying out a particular process control operation (e.g., turning a pump on, actuating a valve), and/or information gathering/management function (e.g., raising an alarm based upon a received field device output signal value) in the context of, for example, an industrial process control system. Examples of application objects include: analog input, discrete device, and PID loop. A class of application objects 210, act upon data supplied by process control systems, such as PLCs, via device integration objects (e.g., OPC DAServer 118). The function of the integration objects is to provide a bridge between process control/manufacturing information sources and the supervisory process control and manufacturing information application.

The application objects 210, in an exemplary embodiment, include an application interface accessed by engine objects and schedulers. The engine objects access the application object interface to: initialize an application object, startup an application object, and shutdown an application object. The schedulers use the application object interface to initiate a scheduled execution of the application object.

Having described the primary components of the hierarchically arranged supervisory process control and manufacturing information application, attention is now directed to FIGS. 3-7 that identify attributes of primitives that make up the above-described object structures. Turning first to FIG. 3 depicts a common object primitive definition. The common primitive is incorporated into all the application objects (i.e., platform, application engine, scheduler, application, etc.). A scripts attribute 300 is used to keep track of scripts that are associated with an application object. The scripts attribute 300 includes scripts inherited from templates as well as scripts created specifically for the particular object type. A UDA (user defined attribute) attribute 302 references inherited and new user defined attributes for an object. An alarm mode attribute 304 indicates whether an alarm is enabled and the extent to which it is enabled. A based on attribute 306 identifies a particular base template from which an object was derived. Attribute 308 stores a string identifying attribute names in an object. A contained name attribute 310 identifies the name assigned to an object within a container. For example, an object may correspond to a "level" contained within a "reactor" object. A deployed version attribute 312 stores an integer identifying a version for a deployed object. A derived from attribute 314 identifies the actual template from which an object was derived. The contents of the derived from attribute 314 differ from the contents of the based on attribute 306. The based on attribute 306 is the base template from which this object was derived from. The derived attribute 314 is the immediate template from which this object was created. For example for a hierarchy of templates as follows:

$DiscreteDevice
 $Pump
  Pump001

$DiscreteDevice is the base template from which a new template $Pump is derived. An instance Pump001 is created from the template $Pump. The attribute "derived from" for object Pump001 will be $Pump. The attribute "based on" for object Pump001 will be $DiscreteDevice.

A relative execution order attribute 316 identifies another object with which a present object has a relative execution order relation. In addition to identifying another object, attribute 316 identifies the relative order of execution of the objects (e.g., none, before, after, etc.). The relative execution order information is utilized to schedule execution of application objects. A hierarchical name attribute 318 stores a full name for an object including any of the containers for the object (e.g., Reactor 1.level). An IsTemplate attribute 320 indicates whether the object is a template or an object instantiated from a template. An AlarmInhibit attribute 322 within an area or container object provides cutout functionality to inhibit alarms for all objects within an area or container. An alarm mode attribute 324 specifies the current alarm mode of an object. The mode is based upon the object's commanded mode if area and container are enabled. Otherwise, the most disabled state of the container or parent area applies. Alarm Mode Command attribute 326 specifies the object's currently commanded alarm mode.

The illustrative example of the present invention supports an object hierarchy. Objects specify such hierarchy in the context of a plant/model view in an area attribute 328 that specifies an area to which an object belongs. A container attribute 330 specifies a container that contains the object. As previously explained, a hosting relationship exists among various deployed objects. In particular, a platform hosts an engine, and an engine (via an area) hosts application objects. Thus, a host attribute 338 identifies an object's host.

A category attribute 332 specifies a class of objects with which the object is associated, thereby facilitating organizing objects according to local associations and/or functionality. The value is one of the categories named in a category enumeration attribute 334. An error attribute 336 identifies errors generated by the object. An InAlarm flag 340 stores a Boolean flag indicating whether an alarm exists in an object. The flag is true only if a Scan State flag 342 is true (the object is on scan) and the object's alarms are enabled. The scan state of an object is changed through a Scan State Command 344 that signals whether to take the object on/off scan.

A security group 346 enables designating a particular security group for the object to limit access/use of the object to particular classes of users. A description attribute 348 provides an area to store a short description of an object. A tag name attribute 350 specifies a unique tag for an object. A warnings attribute 352 lists any warnings rendered by an object.

Having described the common attributes of all objects described herein, a set of object type-specific attributes are described herein below beginning with attributes for a platform primitive with reference to FIG. 4. The attributes identified in FIG. 4 relate to supporting the object/engine/platform hosting hierarchy. While not identified in FIG. 4, a set of attributes are provided through the platform primitive enabling platform objects to monitor/report computer device statistics. Other attributes included in the exemplary platform primitive, but not included in FIG. 4, concern detecting and reporting alarms associated with computer device statistics and storing the statistics.

A RegisterEngine attribute 400 stores a command to register a new engine. The RegisterEngine attribute 400 is used at deployment time to register an engine with a host platform. A StartEngine attribute 402 stores a command to start a particular deployed engine on the platform. A StartHostedObjects attribute 404 stores a command passed to the platform to start all hosted engines that are start auto and start semi-auto type engines. A StopEngine attribute 406 stores a command to stop a particular deployed engine on the platform. An UnRegisterEngine attribute 308 stores a command to un-deploy a previously deployed engine on the platform. An Engines attribute 410 stores a list of all engines deployed on the platform. An EngineStates attribute 412 stores a list of the current operational states of all engine objects hosted by the platform.

FIG. 5 summarizes a set of attributes associated with an engine primitive. An external name attribute 500 stores a string used for external reference. An internal name attribute 502 stores a string used for internal reference. A reference count attribute 504 stores the number of objects referencing the engine object. When the number of references reaches zero, there are no clients, external to the engine, referencing any automation object attributes on the engine. This helps operators determine the impact (how many clients will be affected) of stopping the engine. An object attribute 506 is an array comprising a set of all objects hosted by the engine object. A startup type attribute 508 identifies how an engine object will be started (e.g., automatic, semi-automatic, manual). A CanGoOnscan attribute 510 indicates whether an engine object can be placed on-scan. A BindReference attribute 512 is a command used to resolve references (e.g., pump001.inlet.PV) to handles. These handles are used to locate objects at runtime by the messaging infrastructure. An AutoRestart attribute 514 stores a Boolean value indicating whether the engine object should be automatically restarted upon detection of a failure. A CheckpointFailedAlarm attribute 516 stores a value indicating whether a last attempt to checkpoint hosted objects had failed during a last attempt. An AlarmThrottleLimit attribute 518 stores a value, in alarms per second raised by an engine object before throttling of alarms generated by objects on the engine will occur. An EngineAlarmRate attribute 520 indicates the number of alarms registered on an engine during a last complete scan. An AlarmsThrottled attribute 522 indicates that an engine object throttled alarms during the last scan.

A set of attributes is provided to handle script execution. A ScriptExecuteTimout attribute 524 stores a time limit for a synchronous script to complete execution before an alarm is raised by an engine object. A ScriptStartupTimeout attribute 526 stores a time limit for a synchronous script to startup before an alarm will be raised. A ScriptShutdownTimout attribute 528 stores a time limit for a synchronous script to shutdown before an alarm will be raised. A PublisherHeartbeat attribute 530 stores a value corresponding to the number of seconds an engine object will wait for a heartbeat message from another engine object before it assumes the engine has failed. A Process ID 532 identifies a unique identification assigned to an engine process.

An engine object also contains a set of command attributes associated with managing application objects. A CreateAutomationObject attribute 534 is a command attribute for creating an application object. A DeleteAutomationObject attribute 536 is a command attribute for deleting an application object. A StartHostedObjects attribute 538 is a command attribute for starting hosted application objects.

Turning to FIG. 6, a set of attributes is summarized that are contained within a scheduler primitive and are unique to a scheduler object. Each scheduler object includes internal and external name attributes 600 and 602. A StatsAvgPeriod 604 stores a value representing the averaging period for the scheduler acquiring statistics stored within the attributes described herein below. A CheckpointPeriodAvg attribute 606 identifies the current average of times between checkpoints during the current averaging period. An ExecutionTimeAvg attribute 608 stores a value representing the amount of time to execute all the objects per scan cycle. A HousekeepingTimeAvg attribute 610 stores a value corresponding to the average time per cycle to complete housekeeping operations. A TimeIdleAvg attribute 612 stores a value representing the average idle time per period. A TimeIdleMax attribute 614 stores a value representing the maximum idle time recorded. A TimeIdleMin attribute 616 stores a value representing the minimum idle time recorded. An InputMsgSizeAvg attribute 618 stores an average input message size over the averaging period. An InputMsgsProcessedAvg attribute 620 stores a value representing the total volume of messages processed, in bytes, per scan cycle during the averaging period. An InputMsgsQueuedAvg attribute 622 stores the average number of messages queued per scan cycle during the averaging period. An InputMsgsQueuedMax attribute 624 stores the maximum average stored in attribute 622 since the last time the statistics attributes were reset.

An InputQueueSizeMaxAllowed attribute 626 stores the maximum allowed size of queued messages in a network message exchange input queue. An InputQueueSizeAvg attribute 628 stores an average size of the input queue in bytes during the averaging period. An InputQueueSizeMax attribute 630 stores the maximum average stored in attribute 628 since the last time the statistical attributes were reset.

A TimeInputAvg attribute 632 stores a value representing the average time required, during the current period, to process an input message. An ObjectCnt attribute 634 stores a count value corresponding to the current number of application objects currently being handled by a scheduler object. An ObjectsOffScanCnt attribute 636 indicates the number of application objects that are currently off-scan. A TimeOutputAvg attribute 638 stores an average amount of time required to process output message during a cycle. A StatsReset attribute 640 indicates an request to reset the statistical attributes described for the scheduler that are not regularly reset (e.g., maximum values). A ScanCyclesCnt attribute 642 stores a value indicating the number of cycles since a last resetting of the attributes through the StatsReset attribute 640. A ScanOverrunsCnt attribute 644 indicates the number of times, since a last StatsReset, that a scan cycle ended without completing a scan of all objects. A ScanOverrunsConsecutiveCount 646 stores a current number of consecutive cycles where an overrun occurs. A ScanOverrunHighLimit attribute 648 stores a high alarm limit for consecutive overruns to trigger an alarm stored in a ScanOverrunCondition attribute 650. A ScanPeriod 652 stores a value representing the cycle time for the scheduler.

It is noted that the attributes associated with particular object types are not limited to the particular object primitive types. In fact, all object types comprise at least two of the above-described primitives. All object types utilize the common object primitive. In addition, a platform object includes the attributes of the scheduler, engine and platform primitives described above. An engine object includes the attributes of the scheduler, and the engine primitives.

Turning to FIG. 7, a set of primitives is associated with an application object. Each type of application object has its own set of primitives. The primitives contain the business specific logic and the set of attributes that are unique to the function of the primitives. These primitives can be reused across different application object types.

Figure 8:
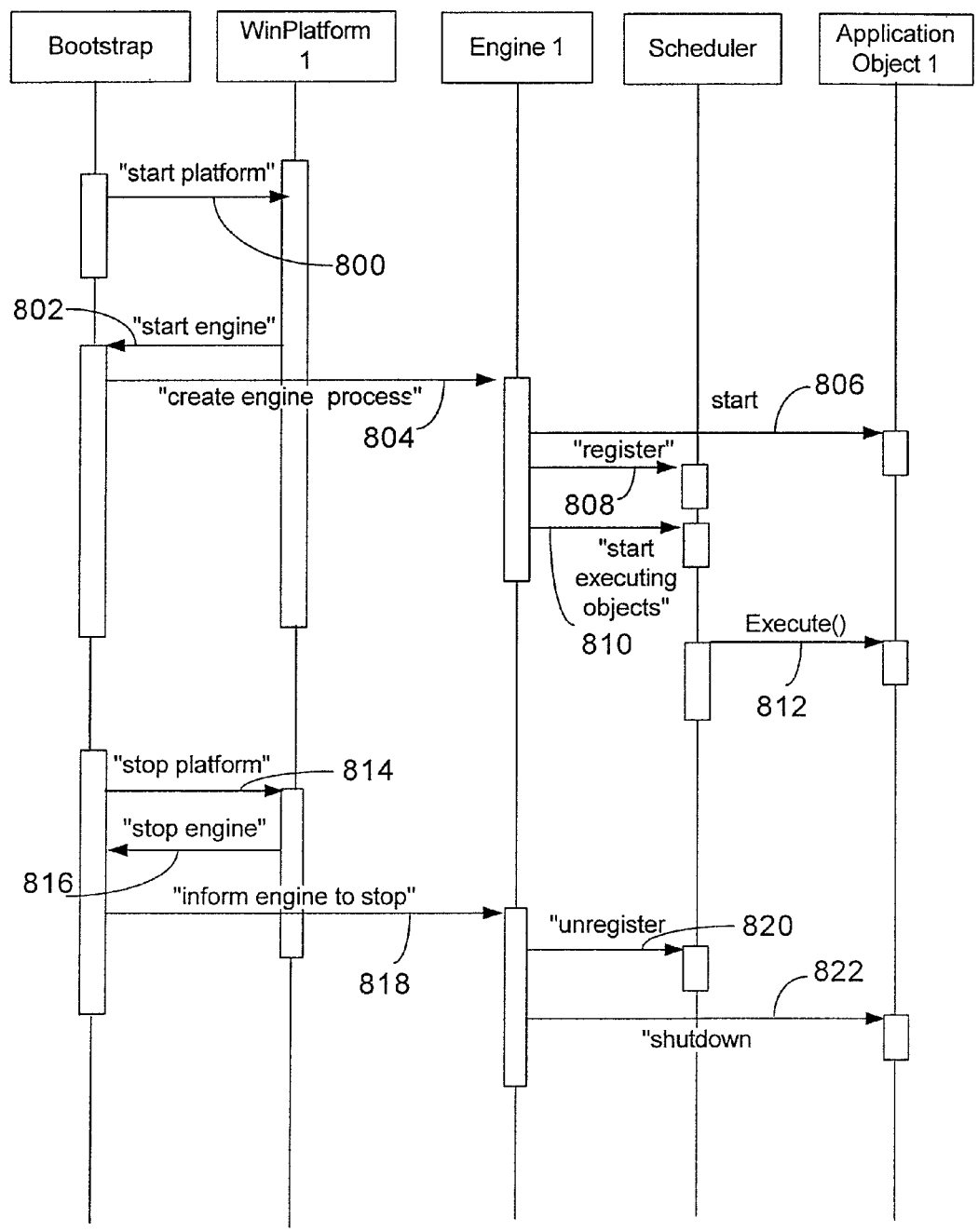
FIG. 8 is a sequence diagram summarizing a set of steps performed to start up a multi-layered application embodying the present invention.

An exemplary set of primitives associated with an analog device application object is depicted in FIG. 7. A primitive 700 labeled AnalogDevice attributes contains a set of analog device specific attributes in which clients would be interested. A PV.Input 701 is a primitive that reads, via a device integration object (e.g., PLC1), the data from a field device. A PV.Output 702 is a primitive that writes, via a device integration object, data to the field. A Scaling 703 is a primitive that performs linear or square root scaling of the data read from the input primitive (PV.Input 701). A LevelAlarms 704 is a primitive that generates alarms if a process variable in the AnalogDevice primitive 700 exceeds or is below configured values. A PV.RoC 705 is a primitive that generates alarms if a PV increases or decreases faster than a preset limit. A SP 706 is a primitive that clients write to when they want to modify the value to which the PV.Output 702 writes. A PVDev 707 is a primitive that is used to generate an alarm if a value read in from a field device (via primitive 701) deviates from a value written to the field device (via primitive 702) by a certain amount. A CtrlTrack 708 is a primitive that is used to enable the setpoint and PV primitives to track changes driven from the external device. Having described the basic building blocks of an supervisory process control and manufacturing information application embodying the present invention, attention is directed to a set of sequence diagrams that summarize methods employed to carry out such an application. Turning to FIG. 8, a sequence diagram depicts steps for the starting and stopping an application embodying a hierarchical hosting relationship. During stage 800, a bootstrap process on a computer system issues a start platform request to a loaded platform object. In response, during step 802 the platform process issues a call to the bootstrap interface requesting the bootstrap to start all the application engines hosted by the platform object. During stage 804, the bootstrap process creates an application engine object having the attributes discussed hereinabove.

During stage 806, the application engine process starts all of its hosted application objects. The application engine also registers the hosted application objects with a scheduler process during stage 808. Registering an application object adds that application object to the set of application objects that the scheduler scans during each scan cycle. At stage 810, the application engine issues a command to the scheduler to begin executing/scanning the started and registered application objects. Thereafter, at stage 812 the scheduler executes the registered application objects. Such execution is performed periodically during each scan cycle.

The scheduler continues to periodically scan the registered application objects in accordance with a supervisory process control and manufacturing information system application until receiving a shutdown command. In particular, the bootstrap process, during stage 814, issues a shutdown command to the platform process in response to an operating system shutdown command. During stage 816, the platform process returns a stop engine command to the bootstrap to commence shutting down all engines hosted by the platform process. In response, during stage 818 the bootstrap issues a request to the application engine to stop. The bootstrap will wait for the application engine to stop. However, after a period, if the application engine has not stopped, the bootstrap will request the operating system to shut down the application engine process.

Under normal operating conditions, during stage 820 the application engine issues a command to the scheduler to un-register the engine's hosted application objects. Furthermore, in an embodiment of the invention, the engine requests to its hosted application objects to shut down. However, in alternative embodiments of the invention the shutdown request is issued by the scheduler in response to the un-register command.

It is noted that in the above-described exemplary embodiment, the engine objects and platform objects communicate with the bootstrap process and handle aspects of the supervisory process control and manufacturing information application relating to physical computing device configurations upon which the application executes. However, the application objects themselves only communicate with the engine and scheduler according to a platform-independent interface. The one or more engine objects hosting the application objects insulate the application objects from characteristics of the computer systems upon which the application objects execute. Thus, the application objects execute independently of the physical computing device configurations. The application objects, though constrained to execute on a same engine with other application objects designated within a same area, are not constrained by any requirement to execute upon a particular one of multiple capable engines and/or platforms within a system. Thus, moving an area comprising a set of application objects is performed with minimal interruption to the execution of other application objects running on the affected engines.

Figure 9:
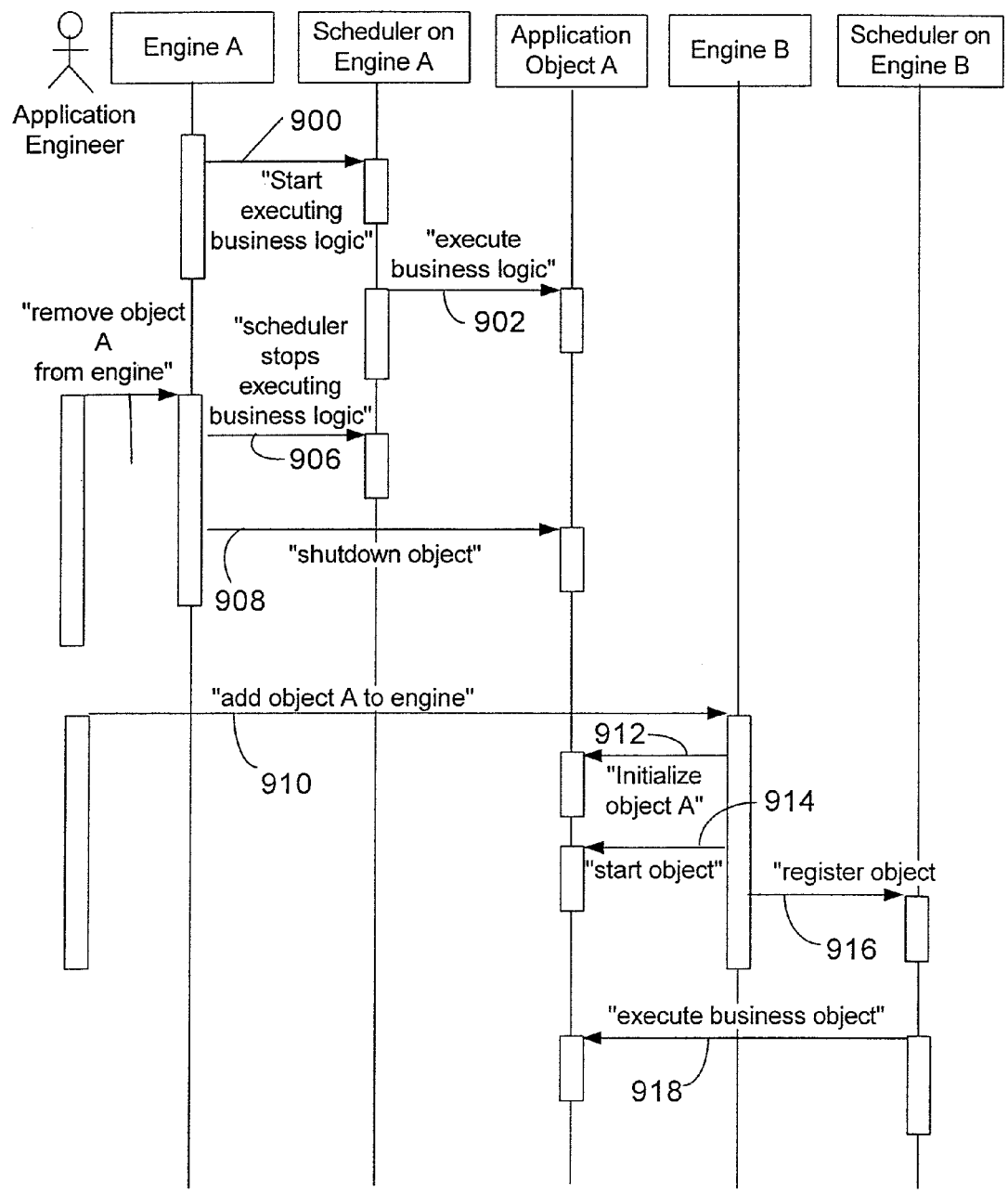
FIG. 9 is a sequence diagram summarizing a set of steps for moving an object to another engine in a network comprising multiple application engines.

Turning to FIG. 9, a sequence diagram illustrates the operational independence of an application object with regard to its engine object host, and the ability to re-deploy an application object upon another host engine. Beginning at stage 900, an engine A issues a start command to a scheduler A to commence periodic execution/scanning of an application object A. During stage 902, the scheduler A periodically activates the application object A to perform its business logic in association with an application comprising multiple application objects.

Later, an application engineer decides to migrate the application object A to an engine B on a different computer platform. One reason to make such a change is to reduce computational load on a computer device as a system grows. The user issues a request to the engine A to remove application object A during stage 904. In response, during stage 906 the engine A issues a request to the scheduler A to stop scanning the application object A. During stage 908, the engine A issues a command to the application object A to shut down. The operation of the engine A and scheduler A is otherwise unaffected by the removal of application object A.

In an embodiment of the invention, the application is spread across multiple computing devices, and each computing device is equipped with the platform, engine and scheduler objects of the application hierarchy that facilitate executing application objects. The replication of lower-level hosting functionality across multiple hardware platforms provides a degree of platform independence that enables relocating an application object without affecting the operation of the application. Thus, during stage 910 the user adds application object A to engine B on a different computer. During stage 912, the engine B initializes the newly added application object A. The initialization stage 912 includes, for example, any custom initialization performed by an application object before starting the application object (e.g., initialization of class variables, caching interfaces used by the application object, etc.). At stage 914, the engine B issues a start command to the application object A. At this point, the object assumes all of its primitives have been initialized and it can perform any initial calculations based on the attributes maintained in these primitives. Engine B registers the executing application object A with a scheduler B on the new computing platform during stage 916. Thereafter, at stage 918 the scheduler B periodically prompts the application object A to execute its business logic. The results of executing application object A are rendered both locally and over a network connecting the engines. Thus, re-locating application object A to engine B does not affect data access concerning application object A.

Inter-Object Communications Via Message Exchange

In an embodiment of the present invention, the application objects reference other objects by logical name rather than physical address. Thus, communications between application objects within a same application, as far as the application objects are concerned, are insulated from the underlying physical configuration of a network containing the application object. A component of the application, referred to as message exchange, embedded within the platform and engine objects enables application objects to retrieve (get) and send (set) data from/to other objects located anywhere within a network executing the distributed application. Message exchange is a peer-to-peer communication infrastructure that enables specifying a target by logical name rather than physical network address. The application objects are thus permitted to carry out communications without regard to the physical location of an intended recipient of a data request. This also enables the application object layer of an application to be developed without regard to where the application objects are ultimately deployed. In an embodiment of the invention, the message exchange is divided between a local message exchange (LMX) carried out by an application engine and a network message exchange (NMX) carried out by a platform to enable named requests to be communicated between computing devices connected over a network for carrying out a distributed application. In yet another embodiment of the invention, the LMX and NMX functionality is carried out by the engines. This arrangement avoids extra, inter-process communications required in the event that the platform object carries out NMX.

The LMX incorporated into the engine objects (e.g., application engine objects) provides services enabling application objects to access data maintained as attributes on other objects. When using LMX services to access target data, application objects specify a string representing a piece of data associated with an object (e.g., an attribute specified in the form of "ObjectB.AttributeA"). With this string, LMX locates the data associated with the object (potentially requesting NMX services provided by the platform to access a target object located on another computing device in a network). LMX returns the data, associated with the object, to the application object that requested the data. In addition, the message exchange guarantees certification of message delivery. Therefore, when application objects send messages to other application objects they receive confirmation that the target of the message received or did not receive the message.

The LMX of the application engine includes, by way of example, a set of interfaces. The set of interfaces comprises: IMxSupervisoryConnection and IMxUserConnection. The IMxSupervisoryConnection interface defines methods used by application objects to access information from physical devices in a plant. The methods used on this interface comprise: SupervisoryRegisterReference, SupervisoryGetAttribute, and SupervisorySetAttribute. The SupervisoryRegisterReference method is called by application objects to inform message exchange that a request to access a value of an attribute is forthcoming. The SupervisorySetAttribute method is used by application objects to direct message exchange to modify the value of the attribute specified in a previous SupervisoryRegisterReference call. The SupervisoryGetAttribute method is used by application objects to direct message exchange to retrieve the value of the attribute specified in a previous SupervisoryRegisterReference call.

The IMxUserConnection interface defines methods used by applications to visualize data retrieved from physical devices in a plant. The methods used on this interface comprise: UserRegisterReference, UserGetAttribute, and UserSetAttribute. These methods are very similar to the methods of the IMxSupervisoryConnection interface described hereinabove. One difference is that the methods of the IMxUserConnection interface methods cater to user interface clients by allowing data updates via a callback mechanism instead of a polled mechanism utilized by the IMxSupervisoryConnection.

A set of structures is utilized to carry out the functionality of the message exchange. An MxReference structure is a MICROSOFT Component Object Model (COM) object that implements an interface IMxReference, identifies an attribute of an object whose value is to be accessed by application objects, and is passed into the methods SupervisoryRegisterReference, and UserRegisterReference. The MxReferenceHandle (an integer value) is used by message exchange to provide application objects a location-transparent means of retrieving a value referred to by an MxReference. The MxReferenceHandle is returned to application objects by the message exchange on successful completion of a SupervisoryRegisterReference or UserRegisterReference call. The MxReferenceHandle is passed in, by application objects, to method calls for getting and setting attributes such as: UserSetAttribute, UserGetAttribute, SupervisorySetAttribute and SupervisoryGetAttribute.

An MxHandle structure identifies a property of an object's attribute. The MxHandle identifies a platform and an engine to which the object belongs. The MxHandle comprises two structures: an MxAutomationObjectHandle and an MxAttributeHandle. The MxAutomationObjectHandle is the data structure used to represent the location of the object within the overall system. The MxAttributeHandle data structure is used to identify the property of an attribute within the object. The MxAttributeHandle structure is used, internally, by message exchange to quickly locate an attribute of an object.

The MxAutomationObjectHandle data structure includes five fields: galaxy, platform, engine, object, and signature. The galaxy field identifies the general system to which the referenced object belongs. A platform field identifies the platform object with which the referenced object is associated. An engine field identifies the object's engine. An object field identifies an object. A signature field stores a value derived from the object's name and prevents configuration mismatches that can occur when an object is relocated.

The MxAttributeHandle data structure includes seven fields: primitiveID, attributeID, propertyID, index1, index2, index3 and signature. The primitiveID field identifies a primitive within an automation object. A primitive is a helper object that performs a specific operation in, for example, an application object. The attributeID identifies a particular attribute within an identified primitive. A propertyID identifies a property of an attribute. Index fields 1, 2 and 3 provide indexes into up to a three-dimensional array. A signature field stores a checksum value derived from the content of the MxAttributeHandle to prevent configuration mismatches.

It is noted that the message exchange, in an embodiment of the present invention, includes additional data structures and interfaces. Such additional interfaces and structures will be known to those skilled in the art. It is further noted that the present invention is not limited to systems that utilize message exchange to provide a hardware/deployment independent messaging service for inter-object communications for a set of application objects within a supervisory process control and manufacturing information application.

Multiple Views/Late Binding Of A Model To A Deployment

Another aspect of the proposed application architecture is the specification of associations within objects. The associations, discussed herein below, enable a configuration component, referred to herein as the Integrated Development Environment (IDE) to filter and display a set of related objects in a variety of views including at least a (logical) model view and a (physical computing) deployment view. The IDE, through its displayed views of an application configuration, enables a user to design and deploy an application in a computer network comprising multiple computing devices.

The application configurations are stored as "packages" within the configuration database 124. A package framework subsystem provides an interface enabling the IDE to store and retrieve the objects of the packages. The package framework employs a relational database to store package data and knowledge regarding the objects' associations/relationships with other objects. The IDE queries the package framework to deliver a list of objects based on a designated association with regard to an object. For example, the IDE can request the package framework to retrieve from a package the objects hosted by a named engine.

A developer builds the aforementioned associations (or "relationships") between objects via the IDE and package manager. Such associations include, by way of example, the following pre-defined assignment relationships: host, area, container, engine and platform. Each of these relationships is discussed herein below.

A host relationship is used at runtime to indicate where an object executes. Furthermore, an object may not be deployed unless its host is deployed. An application object is hosted by an area object, an area object is hosted by an engine object, and an engine object is hosted by a platform object. An area relationship establishes a logical grouping of objects and provides a means for collecting events and alarms raised by objects grouped under the area. A container relationship specifies a loose coupling between two objects and is only meaningful in the context of the application logic. Example: a Valve object contained inside of a Tank object. Contained objects are allowed to acquire hierarchical names within the context of the objects' container. By way of example, a valve that acts as an inlet is assigned the alias "inlet" and receives the hierarchical name of "Tank.Inlet." An object's engine is the actual engine that executes the object. An object's platform is the one and only platform object running on a computer device upon which the object is deployed. An object may have all five of these relationships, but only one object may be associated to any one of these relationships. For example, an application object can be assigned to one and only one area.

A model view depicts the application in terms of logical associations between plant/process equipment within a controlled plant process—e.g., a representation of a physical plant layout. A deployment view depicts the physical computer devices and assignment of instantiated objects identified in the model view to the computer devices and engines executing upon the computer devices. A derivation view depicts the sources (inherited property relationships from base template to instance) of objects instantiated from templates to carry out the functionality of the model view elements.

Figure 10:
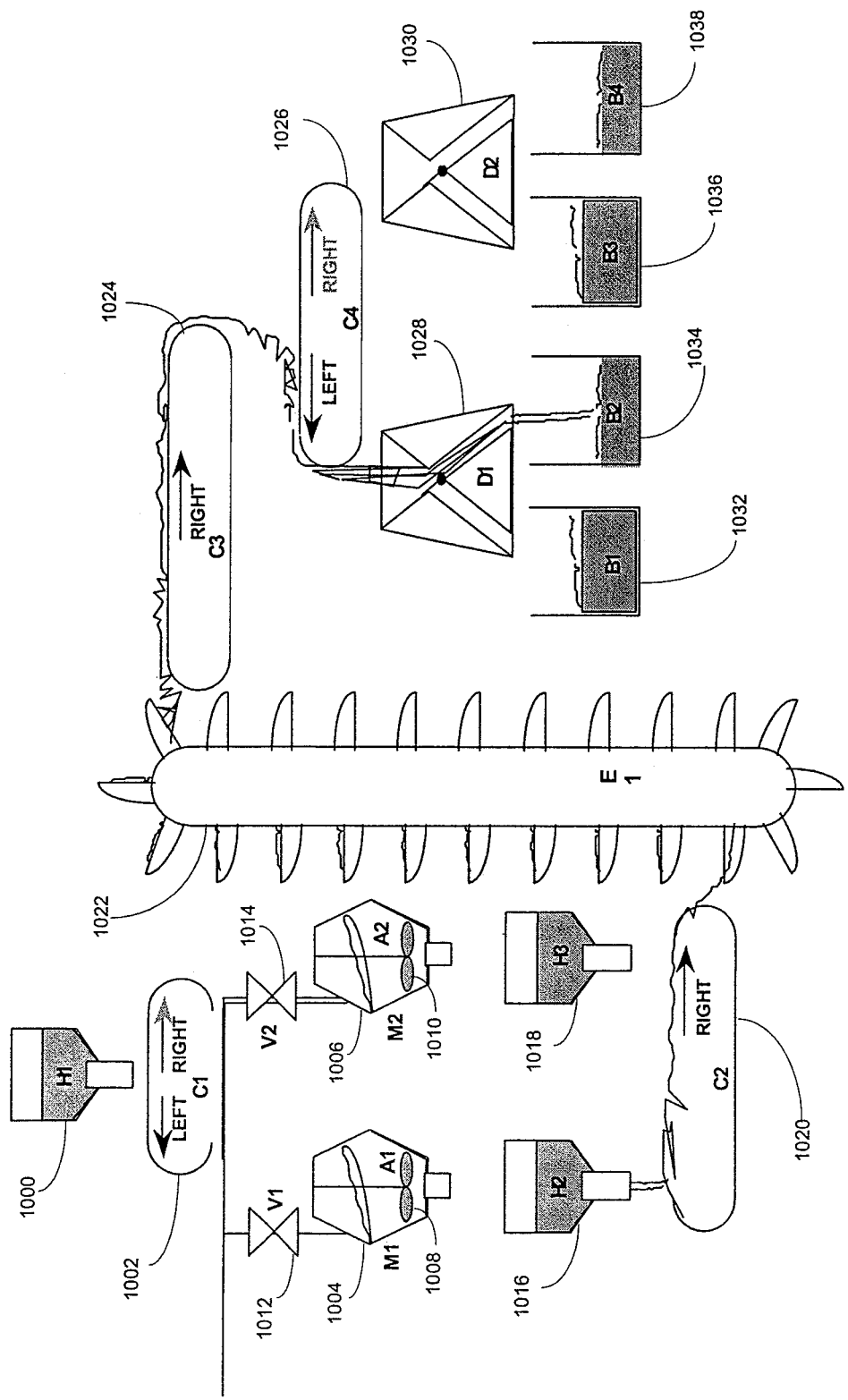
FIG. 10 is a schematic diagram depicting controlled components of a simple plant process.

FIG. 1 shows, by way of example, an application physically deployed to two application server computers 100 and 102. Alternatively, an application is presented to users by visually depicting the role of application objects in carrying out supervisory process control and/or extracting manufacturing information according to the application. Turning now to FIG. 10 a plant process application is depicted, in a plant model, according to the roles of application objects in the plant process. This illustrative example is scaled down for purposes of illustratively depicting an exemplary embodiment of the invention. As those skilled in the art will readily appreciate, the present invention is applicable to a wide variety of industrial/plant monitoring/control applications that are far more complex than this example.

A hopper H1 1000 having a controlled outlet valve delivers raw product to a conveyor C1 1002 that is controllable to travel left, right, or be disabled. The raw product is dumped by the conveyor C1 1002 into a mixer M1 1004 and a mixer M2 1006. The raw product is allowed to pass into the mixers by opening valve V1 1012 and V2 1014 of mixer M1 1004 and mixer M2 1006, respectively. The mixer M1 1004 and mixer M2 1006 include a controllable agitator A1 1008 and A2 1010 respectively. The mixed product drops into hoppers H2 1016 and H3 1018. The hoppers H2 1016 and H3 1018 are selectively opened to allow the mixed product to fall upon a conveyor C2 1020 that either travels right or is disabled. When enabled, the conveyer C2 1020 drops the mixed product onto an elevator E1 1022. The elevator E1 1022 deposits the mixed product onto a conveyer C3 1024 that travels right. The conveyer C3 1024 deposits the material onto a distribution conveyer C4 1026 that is capable of traveling both left and right thereby distributing the mixed product between a first bi-state door D1 1028 and a second bi-state door D2 1030. The door D1 1028 is controllable to direct finished product into either bin B1 1032 or B2 1034. The door D2 1030 is controllable to direct finished product into either bin B3 1036 or bin B4 1038.

While the above-described process line depicted in FIG. 10 is simple, and thus relatively easy to follow, in most cases processes are very complex and include hundreds and even thousands of distinct, sensors and controlled components. In such instances, the application objects corresponding to the sensors and controlled components are logically grouped within areas. The logical grouping of application objects is exploited during runtime to provide a uniform treatment of particular application objects for alarm and event management. For example, all alarms in a particular area can be disabled by a single attribute designation within the area object. The compatibility of the host area and hosted objects is determined by checking the "required host features" of the hosted object and the "supported features" specified by the hosting area object. These object attributes are established when the objects are built. If the "required host features" are met by the "supported features," then the host assignment is completed by assigning appropriate values to hosted objects. An object is placed within an area by designating the area name in the area attribute 328 of the common primitive of an application or area object.

Areas themselves can be grouped within other areas in a hierarchical arrangement. Assigning an area to another "host" area is accomplished, by way of example, by designating the name of the host area in the area attribute 328 of the hosted area object. The relationship between areas and sub-areas are not constrained to execute on a same engine. Thus, sub-areas within an area can be assigned to different application engines when the application objects of a supervisory process control and manufacturing information application are deployed within a system comprising multiple platform objects (corresponding to multiple computer devices) and engine objects. However, in an embodiment of the invention, application objects specified within a sub-area are restricted to deployment on a same application engine. This restriction ensures that processing of all application objects in an area occurs without inter-node communication delays.

Area objects, by way of example, include the following attributes that facilitate the above-described functionality: alarm information, disable all alarms, disable the display of all alarms, sub-area list.

Figure 11:
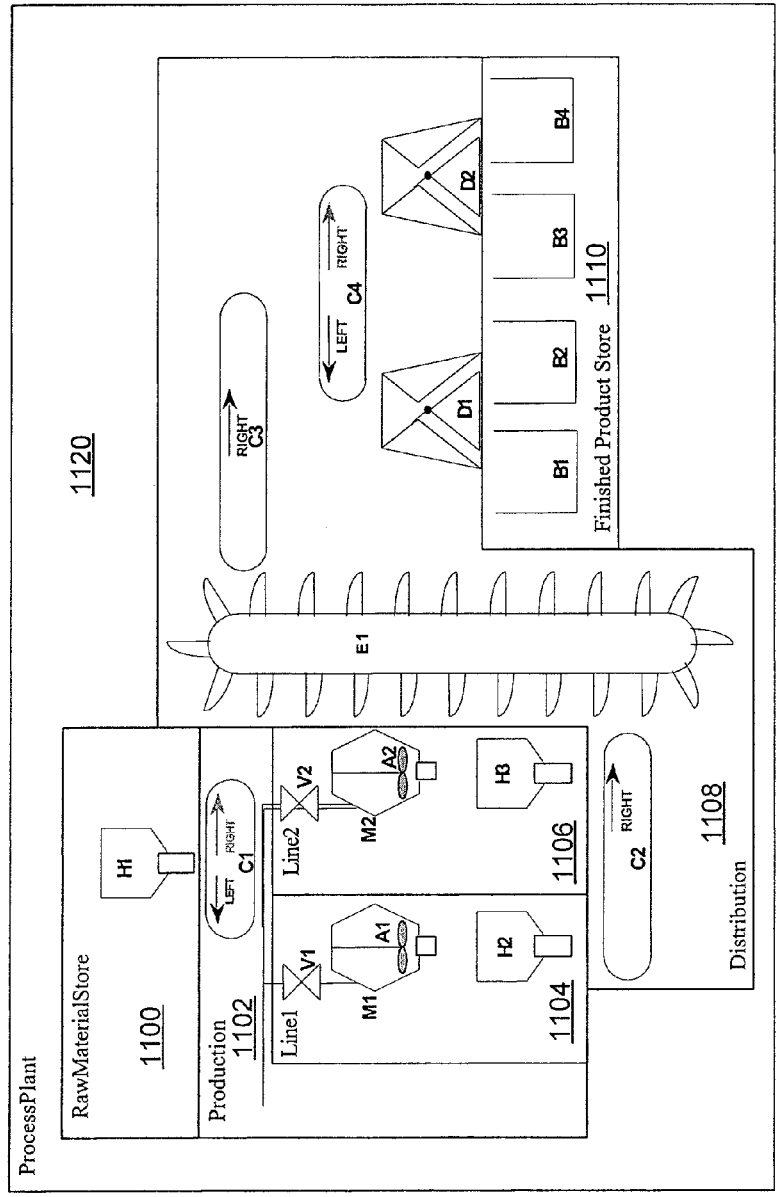
FIG. 11 is a schematic diagram depicting the simple plant process components logically grouped into areas.

Turning to FIG. 11, logical grouping of related process components of FIG. 10 into areas is demonstrated. The revised process illustration depicts the system as a series of areas comprising logically grouped controlled process components. A raw material store area 1100 includes the hopper H1 1000. A production area 1102 includes the conveyor C1 1002, a line1 area 1104 including the mixer M1 1004, valve V1 1012, and hopper H2 1016, and a line2 area 1106 including the mixer M2 1006, valve V2 1014, and hopper H3 1018. A distribution area 1108 includes the conveyor C2 1020, the elevator E1 1022, the conveyer C3 1024, conveyor C4 1026, bi-state door D1 1028 and bi-state door D2 1030. A finished product store area 1110 includes bins B1 1032, B2 1034, B3 1036 and bin B4 1038. The set of sub-areas are grouped under a single process plant area 1120.

Figure 12:
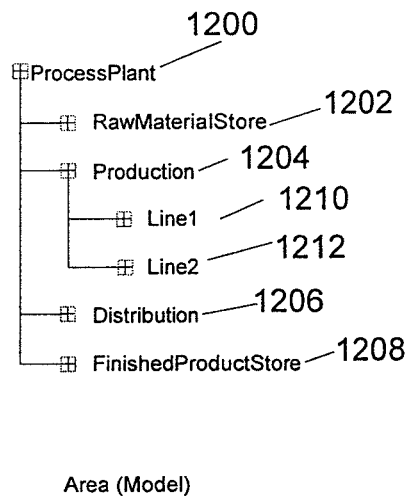
FIG. 12 is a hierarchical tree structure depicting the grouping of areas in the plant arrangement of FIG. 11.

Having described an exemplary plant process and two alternative ways in which to view an application relating to the plant process (i.e., plant model and application object deployment views), a configuration utility interface is described that displays the application components according to these two alternative views. Turning briefly to FIG. 12, a partially completed model view user interface generated by a configuration utility depicts an area hierarchy represented in the form of a tree. The tree structure presents a high-level model view of the areas designated in a process plant depicted in FIG. 11. This model view is incomplete since it does not identify the application objects grouped within the identified areas and containment relationships for application objects.

With reference to the exemplary tree structure, a process plant node 1200 corresponding to the process plant area 1120 is designated at the highest level of the hierarchical area representation. A set of secondary nodes, corresponding to sub-areas grouped within the process plant area 1120, branch from the process plant node 1200. RawMaterialStore node 1202, Production node 1204, Distribution node 1206 and FinishedProductStore node 1208 correspond to the raw material store area 1100, the production area 1102, a distribution area 1108 and a finished product store area 1110 respectively. A line 1 node 1210 and a line 2 node 1212 branching from Production node 1204 correspond to the line 1 area 1104 and line2 area 1106 grouped within the production area 1102 in FIG. 11. This view enables a technician to quickly identify and specify logical groupings for defining policies governing application objects such as alarming behaviors, etc.

Before describing an expanded version of the model view of FIG. 12 identifying application objects and compounds within the identified areas, derivation of objects from templates is discussed. Each of the components identified in FIG. 10 corresponds to an application object. In an embodiment of the invention, application objects are instantiated from object templates. A derivation view represents all the types of templates from which application objects specified by a current model for an application are derived.

The set of candidate templates from which application objects are derived is extensible. Users are provided toolkits including base templates and editors to define customized new templates from which a user builds application objects. Examples of base templates (where $ denotes a template) are: $DiscreteDevice—a state machine that is configurable to create an application object representing the main conveyors and valves depicted in FIG. 10, and $UserDefined—a simple object template that contains only the common primitive, and from which the user builds extensions within the configuration environment by adding scripts and attributes to model the application objects corresponding to the bins and hoppers.

Figure 13:
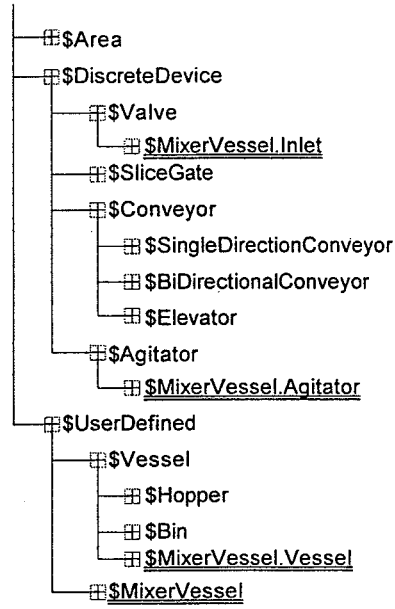
FIG. 13 is a hierarchical tree structure representing the derivation relationships of objects of a supervisory process control application associated with the plant process depicted in FIG. 10.

Turning to FIG. 13, an exemplary derivation view rendered by a derivation view generated is illustratively depicted. With reference to FIG. 13, in the case of the example set forth in FIG. 10, the user derives from a $DiscreteDevice base template a $Valve, a $SliceGate, a $Agitator, and a $Conveyor custom application object template type. Under the $Conveyor template, the user further defines a $SingleDirectionConveyor, a $BiDirectionalConveyor, and an $Elevator template type. Under a $UserDefined base template the user derived a $Vessel application object template. The $Vessel template is further refined to derive a $Hopper and a $Bin application object. With reference to FIG. 13, the base templates occupy the highest levels of the hierarchical derivation tree that is rendered by a configuration view generator based upon a user's designation of particular templates. Object templates derived from the base templates are identified by branches leading from the base template nodes. As depicted in FIG. 13, it is possible to derive objects from other derived objects. In such cases, the children inherit the designated characteristics of their parent templates. The derivation relationship between a child and its parent template is registered in the derived from attribute 314 of the template object.

Application object containment (specified in container attribute 330 of an application object), and the creation of compound object templates from a set of previously defined object templates is another aspect of the template architecture disclosed herein. In an embodiment of the invention, containment is limited to same object types. Thus, area objects can only contain area objects and application objects can only contain other application objects. Objects containing other objects are referred to herein as "compounds." Objects that exist solely to contain other objects are referred to as "composites."

Figure 14A:
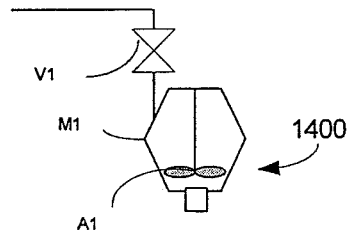
FIG. 14a is a schematic drawing of a mixer vessel portion of the plant process depicted in FIG. 10.
Figure 14B:
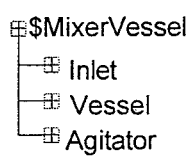
FIG. 14b is a hierarchical model view depicting the containment relationship of a MixerVessel compound application object template corresponding to the mixer vessel depicted in FIG. 14.

Turning briefly to FIGS. 14a and 14b, an example is provided of a compound application object template—in this case a $MixerVessel compound object template that includes a valve object that is assigned the tag name "inlet", an agitator that continues to carry the tag name of "agitator," and a mixer that has been assigned the tag name "vessel." The contained name attribute 310 of the templates corresponding to each of these three contained objects. The full hierarchical tag name (e.g., MixerVessel.Inlet) is stored in the hierarchical name attribute 318 for each of the three contained objects. The container attribute 330 for each contained object is assigned the string "MixerVessel." FIG. 14a schematically depicts a portion of the process plant depicted in FIG. 10 that contains a mixer vessel arrangement. A model view of the compound template showing the containment relationship between the $MixerVessel application object template and its contained (renamed) application objects is depicted in FIG. 14b. In an embodiment of the invention, when instantiated within an actual application, all application objects contained within a compound application object designate a same host in attribute 338 (and by requirement a same area in attribute 328. This containment hierarchy, applicable to other objects as well (subject to any deployment restrictions), assists system developers in developing systems by supporting the creation of logical building blocks (comprising many smaller application objects) from which applications can be built.

A "contain" function supported by the IDE, in an embodiment of the present invention, facilitates establishing containment relationships between objects via a graphical user interface "drag and drop" operation. To establish a containment relationship between a source and target (container) application object, a developer selects the source application object displayed on a user interface, drags the source application object on top of the target (container) object, and then drops the source application object on the target application object. After the IDE confirms the compatibility between the two objects (i.e., they are both application objects), the IDE (through the package manager utility) sets the host, area and container attributes in the source object. In particular, the area attribute 328 is set to the target object's area, the host attribute 338 is set to the target's host, and the container attribute 330 is set to the target object's name. At this point the contained name attribute 310 and the hierarchical name attribute 318 of the source are also filled in with names provided by the developer.

Returning to FIG. 13, the $MixerVessel compound application object template is assigned a branch under the $UserDefined base template node and specifies the contained relationships between the application object template elements of the compound. Furthermore, a $MixerVessel.Inlet template derived from $Valve is placed under the $Valve template node. A $MixerVessel.Vessel template derived from $Vessel is placed under the $Valve template node. A $MixerVessel.Agitator template derived from $Agitator is placed under the $Agitator template node. The containment relationship is registered by specifying the $MixerVessel template object in the container attribute 330 in each of the compound elements. The containment relationship is indicated in the derivation view tree of FIG. 13 by a "$MixerVessel" preamble in the $MixerVessel.Inlet, $MixerVessel.Agitator, and $MixerVessel.Vessel object template representations within the derivation view tree.

Attribute locking and its effect upon change propagation in templates are yet other aspects of the derivation architecture of the exemplary configuration utilities disclosed herein. The derivation architecture enables information within an object template to be propagated to derived objects or alternatively a default value is specified for a derived template that can be overridden by a developer. In an embodiment of the invention, propagation is affected automatically by storing a reference to a parent's copy of a locked attribute.

An attribute in a template or instance can be unlocked, locked in parent, or locked in me. Both templates and instances can have unlocked attributes. An unlocked attribute is read-write, and the object has its own copy of the attribute value—i.e., it is not shared by derived objects. A template, but not an instance can have a locked in me attribute status. In the case of a locked in me attribute, the value is read-write. Derived objects do not get their own copy of the attribute value, but instead share the locked value by reference to an ancestor where the attribute is locked. The status of the attribute in the children of a locked in me attribute is "locked in parent." Thus, changes to the value of a locked in me template attribute propagate to all children. Both templates and instances can have a locked in parent attribute. A locked in parent attribute is read-only.

The interface for getting and setting a locked status of an attribute is exposed to configuration clients. The client obtains a reference to the attribute and sets its locked status. Whether a change to an attribute is permitted and/or propagated to derived children is based upon whether a particular attribute in a template is locked. Locking an attribute has two consequences. First, a locked in parent attribute cannot be modified in a derived template or instance. Second, a locked in me attribute in a template can be changed, and the change is cascaded down through all templates and instances derived from the template containing the locked attribute. On the other hand, if an attribute is not locked, then the attribute specifies a default value that can be overridden in a derived template. Furthermore, if the value of a non-locked attribute is changed, then the change is not cascaded to derived templates.

After establishing a set of templates that are to be used for the application objects identified in FIG. 10, the application object instances are created from the templates according to the proposed supervisory process control and manufacturing information application. Using the templates defined in FIG. 13 and the exemplary process plant depicted in FIG. 10 the following application objects are rendered:

$MixerVessel is used for Mixer M1 and M2;
$Hopper is used for Hopper H1, H2 and H2;
$SingleDirectionConveyor is used for conveyors C2 and C3;
$BiDirectionalConveyor is used for conveyors C1 and C4;
$SlideGate is used for Door D1 and D2; and
$Bin is used for Bins B1, B2, B3 and B4

Figure 15:
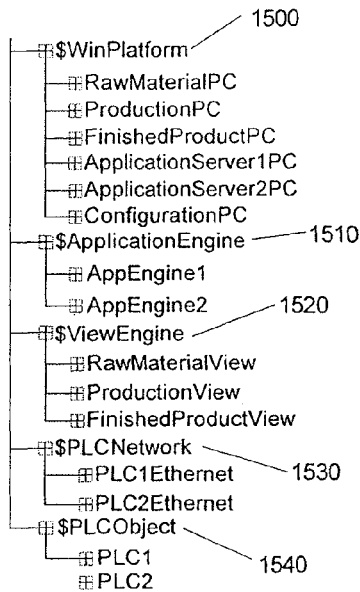
FIG. 15 is a hierarchical tree structure representing a derivation structure for portions of the application associated with the hardware of a system (e.g., platforms, engines, and device integration objects)

Turning to FIG. 15, a hardware derivation view depicts the sources of engine and platform objects from object templates. Such a view is beneficial when deciding where to distribute or re-locate areas that have particular engine and/or platform requirements. Node 1500 corresponds to a WINDOWS operating system-based platform template. A set of platform instances, corresponding to platform objects derived from the WINDOWS operating system-based platform template, branch from node 1500 and correspond to each of the personal computers identified in FIG. 1. Node 1510 corresponds to an application engine template. A set of application engine instances, derived from the application engine template, branch from node 1510 and correspond to the application engines depicted in FIG. 1. Node 1520 corresponds to a view engine template. A set of view engine instances branch from node 1520 and correspond to the view engines depicted in FIG. 1. Node 1530 corresponds to a PLCNetwork device integration object template. A set of instances branching from node 1530 correspond to device integration objects identified in FIG. 1 that support configuring the OPC servers 116 and 118. Finally, node 1540 corresponds to a PLCObject device integration object template. A set of instances branching from node 1540 corresponds to device integration objects identified in FIG. 1.

Figure 16:
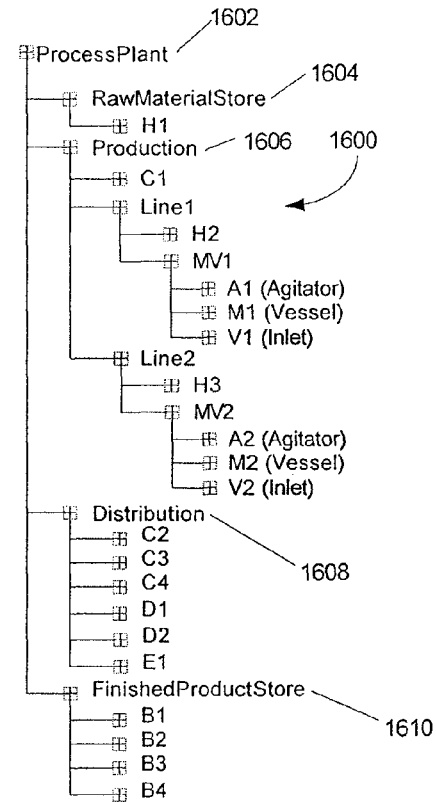
FIG. 16 is a hierarchical tree structure presenting a model view of application object arrangement including the areas with which the application objects are associated.

FIG. 16 represents a model view of the process application depicted in FIGS. 10 and 11. The model view displays area hosting and containment relationships specified by objects (including application objects and areas). The model view identifies the objects that are logically grouped together for purposes of describing the plant layout. The model view enables a user to quickly designate objects that will be treated uniformly under a particular policy (e.g., alarming, etc.). The model view includes, by way of example, nodes corresponding to the areas designated in FIG. 11 and depicted in the area tree structure of FIG. 12. The leaves of the tree 1600 identify the application objects and their assignments to the identified areas. Furthermore, the model view tree depicts compound containers such as a set of compound container objects MV1 and MV2 instantiated from the $MixerVessel compound template (discussed above with reference to FIG. 13).

The model view is rendered by a model view generator based upon the area and container attributes of the objects specified under a particular application. In an embodiment of the invention, the compatibility of an area/container with a grouped/contained object is determined when a user seeks to create the association. This compatibility is determined by comparing the support features of the parent object to the needs of the grouped/contained child object. Furthermore, in an embodiment of the invention all objects within a container are required to designate a same area.

Areas can be hierarchical. Thus, an area can include an area, and a parent area collects alarm statistics for all objects in its sub-areas. In a model view hierarchical tree structure depicted in FIG. 16, starting at the highest level of the tree structure, if no area is designated for an area object, then the area object (e.g., ProcessPlant 1602) is connected directly to the root node (the highest level of the tree). At a next level, sub-areas of the ProcessPlant 1602 (i.e., RawMaterialStore 1604, Production 1606, Distribution 1608 and FinishedProductStore 1610) are connected as branches under the ProcessPlant 1602 node. In the exemplary application model tree 1600, the branches from the sub-areas contain application objects (i.e., hopper H1, conveyors C1-C4, doors D1-D2, elevator E1, and bins B1-B4), and additional sub-areas (i.e., Line1 and Line 2 in the Production 1606 sub-area). The Line1 and Line2 sub-areas both include compounds (i.e., mixer vessels MV1 and MV2). The leaves of the compounds MV1 and MV2 identify the objects contained by the compound objects. In the particular example, the MixerVessel compound MV1 includes an agitator A1, a vessel M1 and an inlet valve V1. The MixerVessel compound MV2 includes an agitator A2, a vessel M1 and an inlet valve V1.

Figure 17:
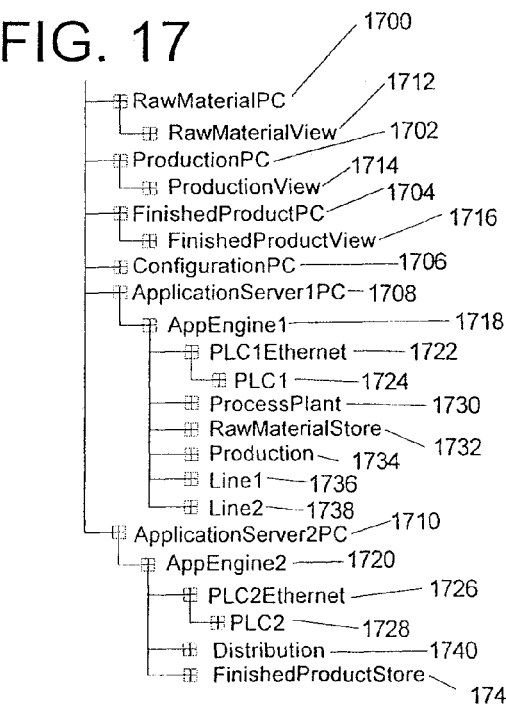
FIG. 17 is a hierarchical tree structure presenting a deployment view of the application to a set of computer devices represented by identified platform objects at the top level of the hierarchy.

FIG. 17 represents an exemplary deployment view of the application model's areas to the hardware and platform depicted in FIG. 1. The deployment view visually depicts where the various objects of an application execute. A deployment view is therefore rendered based upon the hosting (attribute 338) and the containment (attribute 330) relationships designated by objects. A child area object is not constrained to execute upon the same application engine as a specified parent area (in attribute 328), and the area relationships designated by objects are not applied when rendering the deployment view. ApplicationObjects are Hosted (attribute 338) by their area, therefore the deployment view shows the ApplicationObject relationship to its area. Thus, the deployment view (and the actual deployment of nested area objects) does not reflect alarm/event concentration and propagation associated with the hierarchical area model relationships designated between area objects.

The application objects are not displayed in FIG. 17. However, a deployment view generator arranges the application objects under appropriate areas based upon the host/container designations within those objects. In an embodiment of the invention, an application object's designated host and area are, by requirement, the same. Therefore, all application objects referencing an area object are executed upon a same engine object identified in the host attribute 338 of the area object. This requirement ensures that alarms and data maintained for application objects under a particular area are maintained locally on a same computer device. If an application object specifies a container (compound application object) in attribute 330, then the named container overrides the named area host when generating a deployment view tree (i.e., an application object within a compound (container) is placed under its designated compound name). However, in an embodiment of the invention all application objects contained within a compound are constrained to execute upon a same host (i.e., all contained application objects acquire the compound/container's designated area).

The deployment view set forth in FIG. 17 is especially appropriately classified as exemplary since the areas and their associated objects are capable of running on any suitable platform/application engine combination. The multi-layered platform/engine/area/application object hosting arrangement renders the various areas (and their associated application objects) capable of installation at any suitable hosting engine branch in the graphical representation of the deployment of application components depicted in FIG. 17. The highest level of the deployment tree hierarchy identifies a set of platforms corresponding to the personal computers depicted in FIG. 1. The set of platforms represented by nodes include: a RawMaterialPC node 1700, a Production PC node 1702, a FinishedProductPC node 1704, a ConfigurationPC node 1706, an ApplicationServer1PC node 1708, and an ApplicationServer2PC node 1710.

A set of engines is deployed to the platform hosts. The set of deployed engine object nodes corresponding to engine objects hosted by the indicated platform objects includes: a RawMaterialView engine node 1712, a ProductionView engine node 1714, a FinishedProductView engine node 1716, an AppEngine1 node 1718, and an AppEngine2 node 1720.

The engines host device integration and area groupings of application objects that are represented in the deployment view as nodes. The set of device integration object nodes corresponding to deployed device integration objects includes PLC1Ethernet node 1722 and PLC1 node 1724, and PLC2Ethernet node 1726 and PLC2 node 1728. The set of area object nodes corresponding to deployed areas comprising groups of application objects and/or other areas includes a ProcessPlant node 1730, a RawMaterialStore node 1732, a Production node 1734, a Line1 node 1736, a Line2 node 1738, a Distribution node 1740 and a FinishedProductStore node 1742. The branches connecting the above-identified area nodes to their associated engines corresponds to the engines designated in the host attribute 338 in the area objects and their associated application objects that, for the sake of avoiding undue clutter, are omitted from the deployment view set forth in FIG. 17.

The IDE and Using Object Templates to Create an Application

Having described the architecture of an exemplary supervisory process control and manufacturing information application, attention is now directed to design toolkits and configuration interfaces that facilitate quick and efficient development of such applications. Two aims of the design environment are transparency and re-usability. In-essence, a developer should not have to learn complex software coding underlying desired functional capabilities embodied within application object. Nor should a developer have to start from scratch each time a new type of control or monitoring operation is needed. Both aims are addressed in the disclosed template-based design environment.

The application objects defining the functionality of a supervisory process control and manufacturing information application are instantiated from previously defined templates. The templates exhibit a number of desirable behaviors. The templates incorporate an inheritance behavior between a parent template and a child template derived from the parent. For example, a generic "$DiscreteDevice" template is customized by a control engineer to create domain-specific "valve," "motor," and "pump" templates. In an embodiment of the invention, customization of a generic $DiscreteDevice template into domain-specific "valve", "motor", and "pump" templates is performed through the IDE, and only within the IDE. The template creation procedure is graphical user interface driven and thus the end user simply points to the generic template and then issues a command via a menu option called "Create Template". The result is that a new template is created and is "based on" the generic template. The new template inherits its functionality from the generic template. Thereafter, the user configures the custom template to identify a specific object of interest. For example, a motor's states consist of "on" and "off"—so those states are named, and a state count is set to two. Next, the motor-specific values are locked in the motor template. Any template instances that are further derived from the motor template inherit these motor-like qualities. Because the motor qualities (attributes) are locked in the motor template, the values cannot be changed in the descendents. The domain-specific templates are then used any time an application object is needed for any of these three devices.

In an embodiment of the invention, application object templates are capable of specifying associated graphics. Such graphics include, by way of example, windows, symbols, animation and navigation links. The associated graphics can persist in child templates as well as the object instances derived from the customized templates.

Templates also possess the potential to exercise a containment behavior. A template is capable of containing other templates, thereby enabling large object templates to be created from a set of smaller ones. For example, a reactor template contains a drain valve, a level indicator, a steam jacket, and an agitator application object. A locking behavior, described in detail hereinabove with reference to FIGS. 13, 14a and 14b, is yet another desirable behavior provided by the templates in an embodiment of the present invention. Locking forces all children of a locked parent template to carry a same value as the locked attribute.

The IDE provides access by developers to a template library including a set of previously defined object templates including application object templates. From a graphical user interface, such as the one depicted in FIG. 18 a developer specifies objects to be instantiated from the set of templates and thereafter edits fields of the selected templates to create derived templates and designate attributes of objects to be instantiated from the original and derived object templates. Thereafter, objects, including application objects that define the operation of a plant process, are instantiated from the templates.

Figure 18:
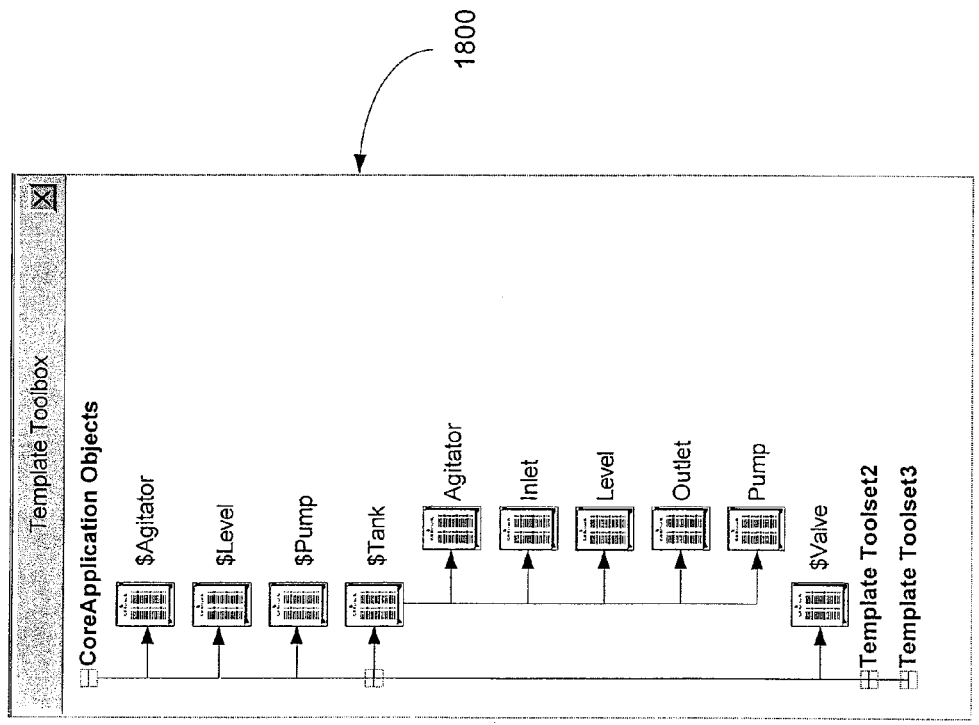
FIG. 18 is an exemplary graphical user interface depicting a set of templates available to a developer to create an application.

With reference to FIG. 18, the various available object templates are displayed within a Template Toolbox window 1800. In contrast to FIG. 13, the disclosed tree structure discloses containment, but it does not depict the derivation relationships between templates. Each template toolset (e.g., CoreApplication Objects, Template Toolset2, Template Toolset3) is displayed as a root node. The first level below a root toolset nodes includes the simple templates and the names of compound (container) templates arranged alphabetically. The compound template $Tank is expanded to show the objects contained within it (i.e. Agitator, Inlet, Level, Outlet, and Pump).

Having described the template-based design environment embodied in an exemplary configuration utility, attention is directed to a source of new object templates utilized by the above described IDE to render child templates and application objects—referred to herein as "object toolkits." The object toolkits provide developers with the ability to create custom application object templates. The custom object templates are then imported into the configuration database 124, configured in the IDE, and deployed to an application engine. The object toolkits also enable the creation of platform, engine, and primitive templates. Furthermore, a license provision is provided to third parties enabling them to create customized templates without infringing intellectual property rights in the original templates.

Figure 19:
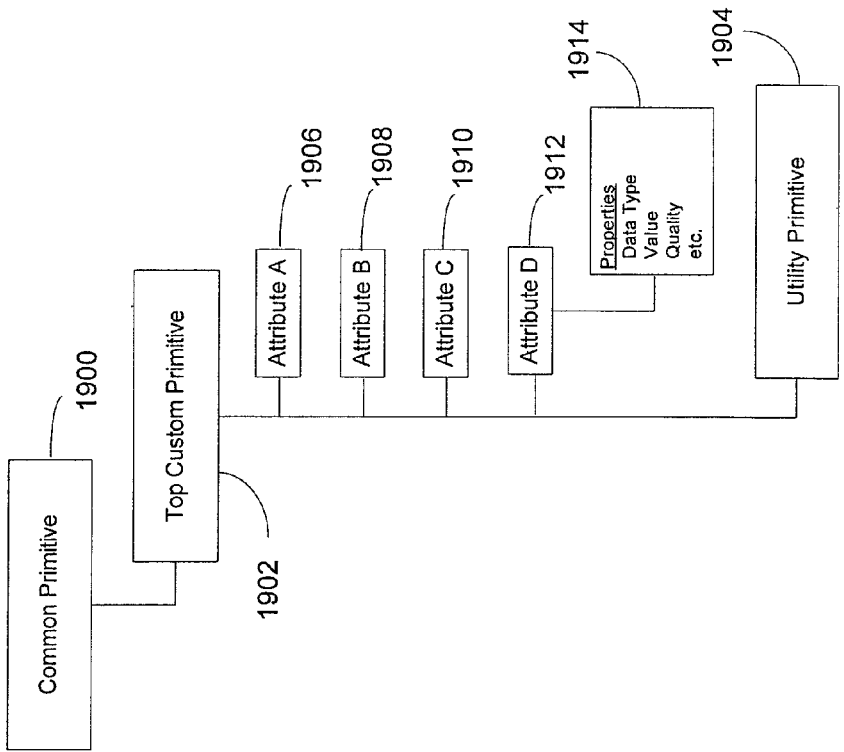
FIG. 19 is a block diagram depicting components and their relations in an exemplary application object template structure.

As an initial matter a general shape of an object template is depicted in FIG. 19. As depicted in FIG. 19, objects comprise a set of one or more primitives. Primitives are logical, generally reusable, building blocks of objects. Furthermore, primitives can be concrete (i.e., they exist within an instance of an object), virtual (i.e., they exist as templates to create concrete primitives, or utility (i.e., they are used by an object or primitive developer to add functionality to the object or primitive such as alarming, history, input, output, output with feedback, etc.). Virtual primitives are used when it is uncertain how may primitives of the specified type will be needed by the object when it is configured. The number is fixed when an object instance is deployed. The primitives expose attributes and properties, and define associated behavior. In an embodiment of the invention, each object has a common primitive 1900 (see, FIG. 3 described herein above). As disclosed previously herein above, the object type (e.g., platform object, application object, area object, etc), and the object's unique capabilities are defined in one or more additional custom primitives such as Top Custom Primitive 1902. A Utility Primitive 1904 (one of a set of pre-fabricated primitives provided with the toolkit) is also included under the Top Custom Primitive 1902. Each of the primitives includes a set of attributes and properties (e.g., attributes 1906, 1908, 1910, 1912, and properties 1914). However, the attributes and properties of the Common Primitive 1900 and Utility Primitive 1904 are omitted in the drawing. In an embodiment of the invention, the properties are hard-coded (the list of properties for a particular attribute are fixed) and therefore need not be named. There is no limitation on the organization of the primitives within an object. An object can include multiple independent and/or interacting primitives of any of the above types.

Also, while not shown in the component summary of an object depicted in FIG. 19, the runtime version of an object includes an object base. The object base creates and initializes the object primitives during runtime. The object base thereafter is responsible for routing calls to the appropriate primitive (with the aid of a primitive table identifying its primitives and a primitive ID within the handle included in the request), and more generally the object base is responsible for routing calls from the message exchange to appropriate components of the object. The runtime embodiment of the object includes an attribute table component comprising: support for checkpointing, support for publishing/subscribing, attribute MxHandles, references to attributes within custom code. Similarly, attribute definitions in an attribute definition structure guide the creation of attribute table entries when the attribute table is instantiated.

Figure 20:
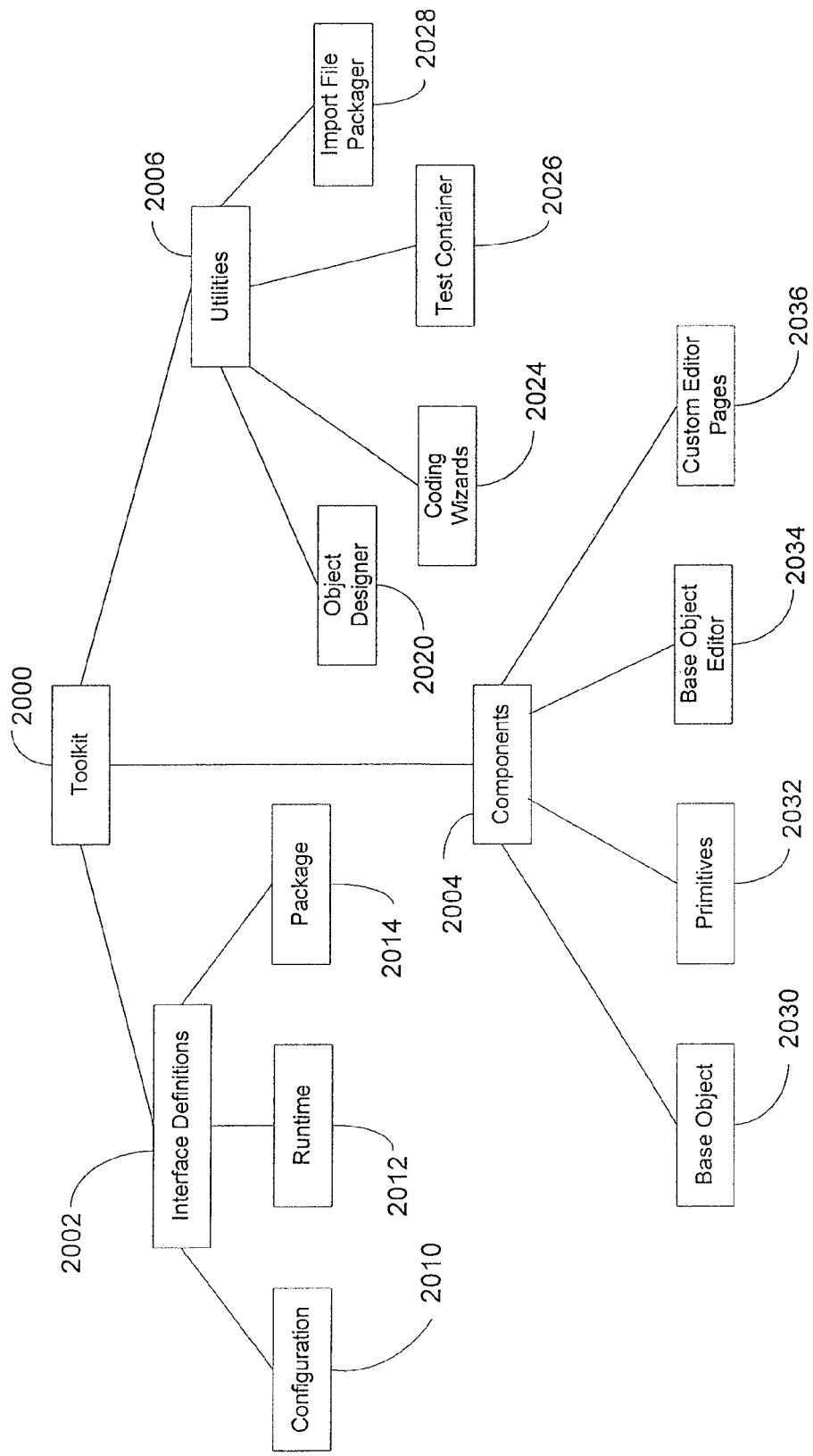
FIG. 20 is a block diagram depicting interfaces, components, and utilities that provide the functionality of a toolkit in accordance with an embodiment of the present invention.

Turning now to FIG. 20, a set of blocks depict the functional components of a toolkit 2000. The toolkit 2000 includes interface component definitions 2002, components 2004, and utilities 2006. The interface definitions 2002 include a Configuration (editor) Interface 2010, a Runtime Interface 2012, and Package Interface 2014. The set of interface definitions 2002 enable a single object to provide useful interaction with a variety of environments (e.g., editing, validation, runtime, etc.). The Configuration Interface 2010 supports a set of methods enabling an object's configuration to be edited by the IDE. The Package Interface 2014 supports a set of methods enabling the object to be packaged and then imported, exported, uploaded, downloaded, copied, and/or stored within the configuration database 124.

Attributes are the portions of an object that are accessible by message exchange. They generally are classified as configuration (set at the time of configuration) and state (set during runtime). The Runtime Interface 2012 supports a set of methods executed on identified attributes that provide behaviors to the object during runtime when an object is deployed on a host application engine. The runtime interface 2012 comprises a GetAttribute and a SetAttribute method enabling other objects to access exposed attributes on the object. A GetAttribute call includes the following inputs: attribute handle, access level (for security), and locale ID (for localizing language). The GetAttribute call returns the requested data and quality of the data. The SetAttribute method is used to set a value and/or invoke an action by the object (a pseudo-remote procedure call. The SetAttribute call includes the following inputs: attribute handle, confirmation handle, write type, access level, access level verifier, data in. The SetAttribute call returns an optional response value. Other exemplary methods include lifetime commands: an initialize command issued by an application engine to an object to inform the object of its assigned ID and passes any required interfaces and a close command called by the application engine to shut the object thread down. After initializing, a scheduler periodically invokes operation of the object via an execute command. A data publisher on LMX issues calls to a subscribe and unsubscribe method to commence and is discontinue providing particular attribute data without requiring further get commands to the object. A getsubscriptiondata call returns a list of all attributes that have changed since getsubscriptiondata was last called. A getcheckpointdata call returns a list of all attributes that have changed since the last time the method was called. Lost data can be restored from the checkpoint via a call to BeginRestore. EndRestore identifies when the restoration is complete. A BindLocalHandle call resolves a request by an application engine to provide an object's handle (MxHandle). It is noted that the above-described methods are merely exemplary. Those skilled in the art will readily appreciate that the set of methods executed on attributes can be extended in accordance with other embodiments of the invention.

The utilities 2006 support the object template development process. An Object Designer 2020 is a graphical utility that enables a developer to develop new objects and primitives for objects. A developer, through the Object Designer 2020, specifies primitives and attributes within an object or primitive. The Object Designer 2020 facilitates configuring an object template's attributes, specifying supporting primitives (including the utility primitives identified herein above), and configuring the attributes of the associated primitives. The Object Designer 2020, in addition to allowing attribute values to be specified, allows totally new attributes to be defined.

In an embodiment of the invention, the Object Designer 2020 supports a basic mode and advanced mode. The basic mode facilitates creating application objects comprising the common primitive, a custom primitive, and utility primitives. The advanced mode facilitates creating new primitives, or a hierarchy of primitives, and/or an object comprising a hierarchy of primitives. The object designer also enables a user to launch a code wizard that generates skeleton code for a primitive.

A set of code wizards 2024 generate source code for a specified target language based upon an object or primitive definition rendered by the Object Designer 2020. Resulting wrapper classes for the object will expose the object as being defined in the target language. In the case of C++ code, an attribute class is provided and a custom object class containing attributes are generated. The attributed class contains assignment and casting operators that allow appropriate rows within the attribute table to be accessed when the wrapper class's attributes are accessed. In the case of Visual Basic code, an attribute class is provided and a customer object class containing attributes is generated. The attribute class contains Get and Set Property routines that access the proper row of an attribute table.

The code wizards 2024 generate a set of output components corresponding to the supplied object or primitive definition. A set of include files are generated to enable a developer to access primitive attributes by name rather than internal identification. A runtime code shell generated by the code wizards 2024 lays out the framework for all code required by the object during runtime. Exemplary entries specify code for the following methods supported by an object: execute, startup, onscan, offscan, and shutdown. A package code shell generated by the code wizards 2024 lays out the framework for methods that are needed to interact with the configuration database 124. A custom editor code shell generated by the code wizards 2024 provides a user interface for specifying the contents of a file that supplies the content for an editor to display to a user when configuring the object/primitive via the IDE.

A test container 2026 provides testing, debugging and diagnostics capabilities for any one of the Runtime, Package, or Editor components of a primitive or object defined and coded in the toolkit design environment. Object attributes are set and values are retrieved and logged.

An import file packager 2028 creates an import file from the code modules and attribute data specified when the object was defined. The resulting import file contains the template package representing the newly defined object class as well as template packages representing all primitives that were configured and used within the packaged object. The template package includes the binary code, a dictionary file, and an object's definition. In an embodiment of the invention, primitives can be packaged within object packages, but cannot be imported by themselves.

The components 2004 comprise the various pieces of data and code from which the object is created. A base object 2030 is a base object template selected by a user from a set of available class-specific base objects. A set of primitives 2032 are provided from which a user selects particular ones that are included in the object. When a user selects a particular primitive for inclusion in the object, a row is created in an attribute table for the object for each contained attribute. Each primitive can be extended through the designation of script primitives and user defined attributes.

The set of primitives 2032 includes the set of utility primitives (e.g., input, output, output with feedback, alarm, history, etc.) mentioned previously above. The input/output primitives are utilized to transfer data between the object and other objects via message exchange. The input/output primitives encapsulate the details of message exchange and name binding services (e.g., providing a location-specific handle for a named object). Primitives for alarms, events and historization facilitate uniform handling of these activities in a runtime environment. The set of primitives 2032 also includes script primitives that handle the details of extending an object's functionality through the inclusion of one or more scripts hosted by the object. User defined attribute primitives enable users, through the IDE, to add attributes that were not specified during the object design stage using the toolkit. These attributes are referenced from scripts, but cannot be referenced by the custom code created during the design stage using the toolkits. The set of extension primitives is not limited to scripting or user defined attributes and can be extended to cover extending existing attributes (e.g. Input Extension, History Extension, etc.)

An object is also includes editor components. A base object editor 2034 provides standard editor pages common to all objects. Custom editor pages 2036 provide editor pages for the customized portions of an object definition.

Figure 21:
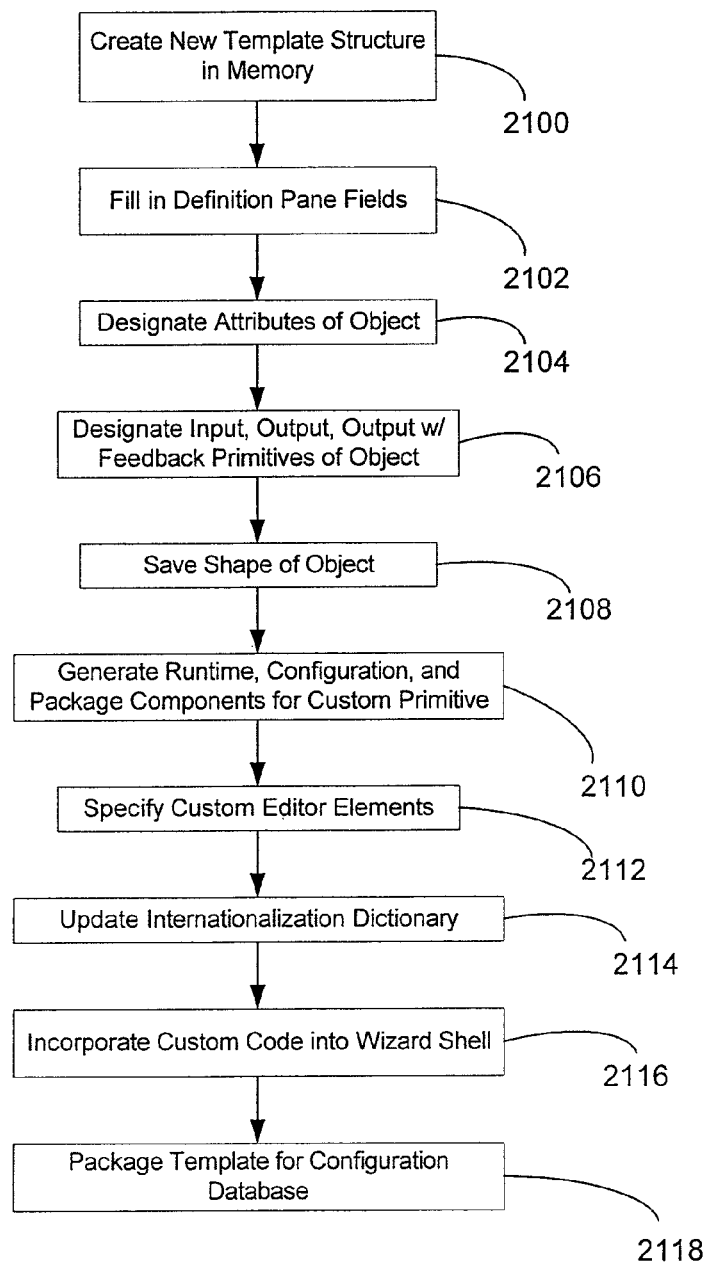
FIG. 21 is an exemplary flowchart summarizing a set of steps performed to create a new application object template in accordance with an embodiment of the present invention.

Having described components of an exemplary object design and implementation toolkit and objects created from the exemplary toolkit, attention is now directed to a exemplary sequence of steps performed by a developer to create new primitives and objects through the exemplary toolkit. With reference to FIG. 21, a set of exemplary steps summarize the general workflow of a developer to create a new basic application object in the basic mode of operation of the toolkit's Object Designer 2020. The summarized sequence of steps are commenced when the developer chooses an option at the top-level of a set of toolkit screens to create a new application object template. In response, during step 2100 the Object Designer 2020 creates a new template in memory. During step 2102 a definition pane is rendered to prompt the developer to enter the following identifications for the template: template name, vendor (developer's business name), toolset name (IDE toolset name under which the new template will be placed—see, FIG. 18, short description, GUID (serves as the major version of the template), minor version. The category "application object" and required host "area" are automatically generated when the application object is created.

During step 2104 attributes are added to the template. For each attribute the developer specifies one or more of the following supported descriptors:

Name

Data Type—in the case of an enumeration field, the developer specifies an attribute holding the array of strings upon which the enumeration is based Attribute Category—whether the attribute is readable/writeable at configuration/runtime, whether it needs to be deployed Initial Attribute Value Attribute Quality calculation capability Default Security Classification Whether the attribute has a handler for set commands at configuration/runtime Alarmed—whether the attribute supports alarms, and if yes, then the attributes of the alarm Historized—whether the attribute can be historized Has Quality—a flag indicating whether the attribute has an associated data quality calculated at runtime Frequently Accessed—a flag notifying browsers in situations where attributes are filtered Define a default attribute for the object by creating a .PV named attribute Next, during step 2106, the developer, through the Object Designer 1024 graphical user interface selects ones of the input, output, and output with feedback primitives that are to be included in the new application object template. For each primitive specified during step 2106, the developer specifies a name and properties (e.g., data type). The primitive at this point is designated as a virtual primitive if desired. If virtual, then the developer is also responsible for programming the code to load/unload the primitive at configuration time. Input and output primitives are displayed on the Object Designer 1024's rendering of the object under construction as new attributes. They are not connected to existing attributes. During step 2108 the developer invokes a save operation on the Object Designer 1024 interface, and an object file is stored containing the shape of the object—e.g., the component configuration including, for example, name, list of attributes and initial values, execution group, names of associated code modules, and embedded primitives.

Thereafter, during step 2110 one of the coding wizards 1026 (e.g., a C++ wizard) is invoked to create an editor component, package component, and runtime component of the top custom primitive. In an embodiment of the invention, separate code modules are created for each of the three components of the custom primitive—and all primitives. The activated coding wizard also fills associated files in an implementation details section of the application object template.

Next, during step 2112 the developer specifies editor elements relating to the configurable portions of the template. In response, a custom configuration editor file is created. During step 2114 the developer adds any desired entries to the dictionary file (for internationalization) by directly editing such file.

During step 2116 the developer supplies custom code incorporated into the skeleton code generated by the wizard during step 2110 for the package and runtime components of the application object template. During step 2118 the application object template is packaged in a file named by the developer. Thereafter, the packaged template is ready to be imported into the configuration database 124. Upon completion, files exist that define the new application object template (e.g. object shape file, numerous code files.).

In addition to the above-described scenario, the disclosed development toolkit environment supports a number of different design scenarios. In an advanced mode of operation, the toolkits are capable of re-using previously defined custom templates to generate other application objects. In this case, a previously defined custom primitive is retrieved by the Object Designer 2020 after creating an object hierarchy. Thereafter, the attributes and embedded primitives are configured and the remaining steps 2108 to 2118 are performed as described above.

In an advanced mode, a developer can define a new primitive comprising attributes and potentially other primitives. Such primitive packages are advantageously incorporated into complex hierarchical objects comprising multiple primitives that either, on their own, or together can be application objects. An example is an analog input primitive that can exist as an application object, or alternatively be incorporated into a drive or pump application object. Initially, the developer specifies a primitive hierarchy. Thereafter, the developer specifies attributes for the primitive. The developer also specifies input/output, alarms, and history characteristics for the primitive. The shape of the new primitive is saved. A coding wizard is applied to the primitive shape to render skeleton code for the primitive. The skeleton code is augmented by the developer and projects are built based upon the resulting template structures. A template file is then created and stored in the toolkits for use in creating other primitives and advanced application objects.

Creating an application object template in advanced mode introduces greater flexibility in defining the content of the object. After launching the Object Designer 2020 and inputting a template definition, the developer designates previously defined and stored primitive definition files into an application object hierarchy. If the primitive is virtual, then the developer provides package component code that loads the primitive at configuration time when needed. The developer is able to override previously specified attribute properties (e.g., value, security classification, lock status, etc.). After performing previously described code generation and editing steps, the object is packaged for import to the configuration database 124.

It is noted that while the discussion herein above has focused primarily upon creating application objects through the toolkit. In an embodiment of the invention, the toolkit is not limited to creating application object templates and its capabilities extend to all automation objects (e.g., platforms, engines, device integration objects, etc.).

Yet another aspect of developing and customizing applications to particular control environments is the use of custom scripts that add behavior/capabilities to an application object template. Such scripts are provided, by way of example, to tie the individual objects of an application together to render a single, fully integrated process control application. In an embodiment of the present invention, such integration is achieved through customized scripts that are defined by users and added to previously existing object templates. Scripts can be provided to activate a user interface button when an application object is activated or to respond to opening or closing a user interface window. Scripts can be added to add a new calculated output value to an object. The customized scripts are inserted/integrated into application object runtime components via script editors. The script editors are invoked, by way of example, via the IDE or the toolkits described previously hereinabove.

Figure 22:
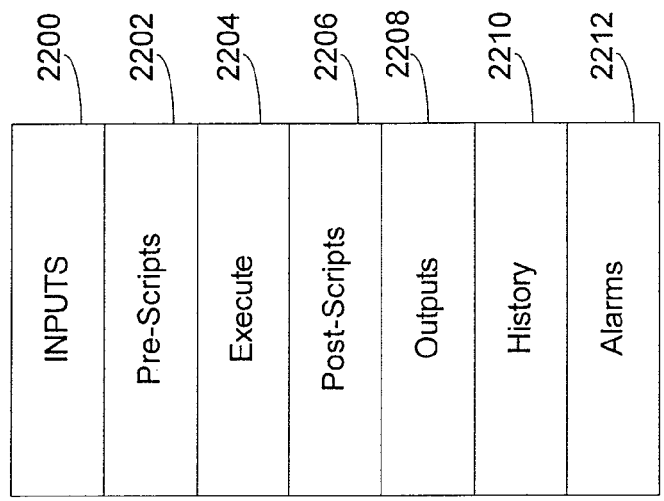
FIG. 22 summarizes a set of stages in the execution of an exemplary application object during a single scan cycle.

Turning initially to FIG. 22 a set of execution stages within an exemplary runtime component of an application object is depicted. It is noted initially that the depicted stages are associated with an application object's "execute" runtime behavior—i.e., the behavior when an object has been brought on-scan for periodic execution under the control of a scheduler. The exemplary execution stages present two portions where the customized scripts are executed in accordance with an object's "execute" runtime behavior. The listed stages are presented in their order of execution. The stages are generally executed each scan cycle under the direction of a scheduler associated with an application engine. Initially, during input stage 2200 all input primitives within application objects on an engine are executed. Thereafter, during a pre-scripts stage 2202 a first set of customized scripts are executed. The customized pre-scripts relate, for example, to filtering and input pre-processing operations. An example of such an operation is a data change script attached to one or more input primitive's value(s). For example, a third value "Delta I1-I2" calculate the difference between I1 an I2 input attribute values determined during the input stage 2200.

During execute stage 2204 the code of the objects' custom primitives is executed. Thereafter, during post-scripts stage 2206 a second set of customized scripts are executed. The customized post-scripts relate to operations such as overriding values calculated during the execute stage 2204 and calculating additional values exposed as UDAs of the object. During an output stage 2208 all output primitives within application objects are executed. Next, during history stage 2210 any historization primitives are executed and data is forwarded to history objects. During alarm stage 2212 all alarm primitives are executed and alarms are passed to the areas within which the application objects are grouped.

Having described an exemplary set of executed application object stages, it is noted that the content of the stages as well as their ordering differs in alternative embodiments of the invention. Thus, the content and order of execution of stages is not to be construed as a limitation to the present invention. A user can define multiple scripts for a particular object. In that case, the scripting architecture supports designating a relative order of executing the scripts to ensure that dependencies between values determined by the scripts are properly handled.

Other scripts can be provided for runtime behaviors/methods other than the "execute" behavior described above to handle non-repeating tasks. Such runtime behaviors/methods include "startup", "shutdown", "On OnScan", and "On OffScan." External objects are instantiated during startup and destroyed during shutdown. If further distinction is desired, In an embodiment of the invention where the additional behaviors are supported, the script editor supports script tagging to identify when the scripts, or portions thereof, are executed. If further distinction is required, then the On OnScan and On OffScan behaviors/methods are implemented to handle particular tasks associated with bringing an object onscan and offscan. The implementation of on-time procedures introduces the need to potentially persist particular variables outside an execution cycle in which the variables are set. This is accomplished, by way of example, by defining the variables under the application object, or alternatively by implementing the variables as public variables of the script class (enabling other scripts to access the variables).

In an embodiment of the invention, support for scripting languages is divided into two areas. The first (user-side) area comprises scripting languages utilized by developers in the IDE environment. The second (execution-side) area comprises a scripting language for presenting instructions to a scripting engine when application objects are processed in a runtime environment. In accordance with an embodiment of the present invention script instructions from two or more distinct user-side scripting languages are translated/mapped/compiled down to a same execution-side scripting language.

The scripting environment simultaneously hosts multiple user-side scripting languages. The multiple user-side scripting languages accommodate different user skill sets and application specific scripting language requirements/capabilities. Providing multiple user-side language support to users carries the potential for a user to select an inappropriate or less desirable scripting language to write a particular script. In an embodiment of the invention, warning mechanisms are built into an editor to detect the type of script and suggest a preferred script. The user need not follow the suggestion. Furthermore, the user-side script environment will provide access to a set of script-independent shared procedures that can be called from scripts written in any of the supported user-side scripting languages.

Figure 23:
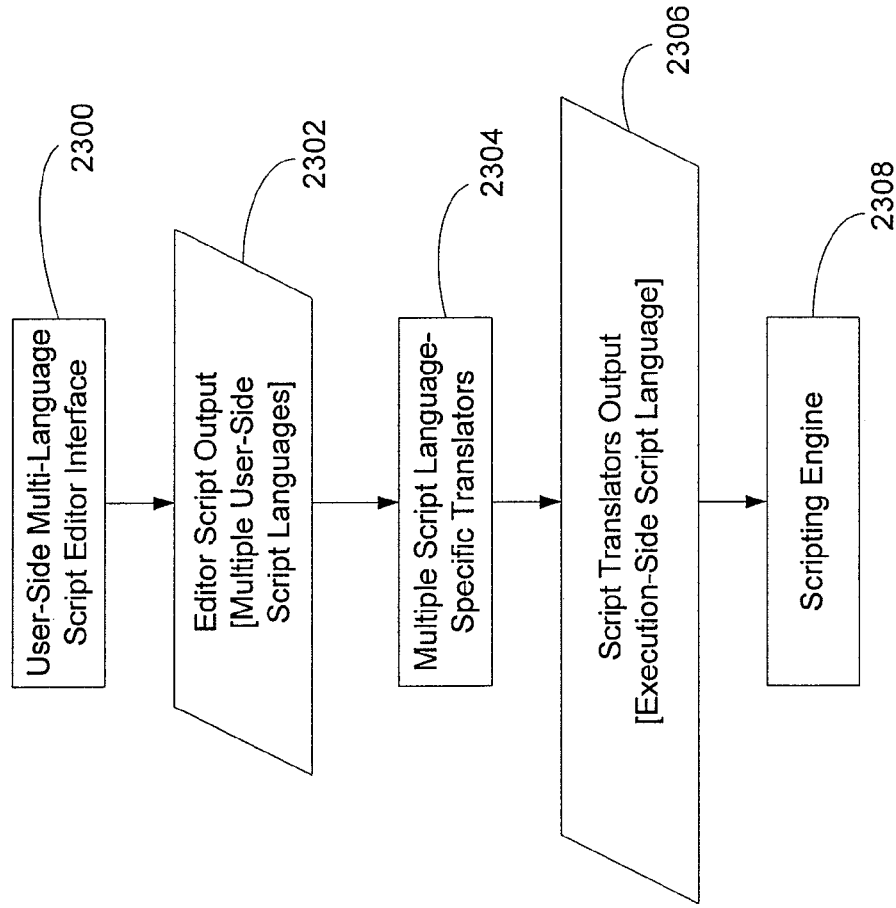
FIG. 23 is a flow diagram depicting the stages of a script's development and execution in an embodiment of the present invention.

Turning now to FIG. 23, a flow diagram schematically depicts the passage/transformation of instructions from an input state (user-side script) to an execution state (execution-side script). Initially, a set of one or more editors provide multi-language user-side scripting language support via script editing interface 2300. In an embodiment of the invention the script editing interface 2300 includes a common script editor portion and a set of language specific editors that augment, to the extent needed, the capabilities of the common script editor portion.

In an embodiment of the invention, the editing interface 2300 supports point and click script generation. In such case, developers select a particular graphically represented script construct from a toolbox pane. After placing the graphical object (e.g., a flowchart block) at a desired location, the developer selects and edits the inputs and labels associated with the graphical object.

Scripts (or segments thereof) are intended to be attached to re-usable templates. This presents a problem of naming attributes since templates are often locked, yet different names can be desired/required when the re-usable script segments are incorporated into scripts. The need to specify a particular script attribute name based upon its location is addressed by relative extension identifiers. The relative extension identifiers (e.g., me, my_container, my_area, my_engine) facilitate specifying the attribute generally at development time (when an actual name is unknown) and establishing an actual name at runtime based upon the location of the script's object. Alternatively, an alias table pairs an attribute reference in a locked pre-written script to a user-designated alias for the locked attribute name. Initially, a script for a template designates a reference name. The script template is locked, thereby preventing direct changes in its children. When editing a script based upon the locked script segment, a user designates an alias for reference name in the alias table, and the alias name is substituted for the original reference name whenever the reference name is encountered in the template's script.

In accordance with an embodiment of the invention the set of user-side script languages include, Quick Script, IEC 1131 Structured Text, Visual Basic, Functional Block Charts, and Sequential Function Charts. Functional Block Charts and Sequential Function charts support programming via graphicalbuilding block manipulations. Quick Script, directed to the casual user, is derived from WONDERWARE's INTOUCH system. IEC 1131 Structured Text, also directed to the casual user, is based upon the well known standard by the same name by the International Engineering Committee. Visual Basic provides a more powerful programming environment, but requires greater programming knowledge on the part of the script writer. Those skilled in the art will appreciate that a variety of other input script languages are appropriate for carrying out the present invention in view of these examples.

The following is an exemplary code segment for adding a new user defined calculated output attribute to an existing object that includes a first input I1 and a second input I1. The new user defined attribute represents the difference between I1 and I2.

```
$Add_Delta
  Add UDA "Delta"
  Add Script Extension
  Select Language
    Quick Script
  Me.delta=ABS (me.I1-me.I2)
```

The script editing interface 2300 provides script editor output 2302 including: shared procedures called by the script, internal attributes, external attributes, and the script itself. Thereafter, in accordance with an embodiment of the present invention, the editor output 2302 is processed by one or more of a set of user-side script translators 2304. As shown in the example above, in an embodiment of the invention, the script editor output 2302 includes script language tags indicating a particular one of the multiple user-side scripting languages (e.g., Quick Script) supported by the editor interface 2300 and translatable by the multiple script translators 2304. The language tags operate as switches to invoke a particular one of the script translators 2304. The granularity of handling such tags can identify a particular user-side script language for: a particular instruction, a particular group of instructions, an entire script, etc. Alternatively, the output of a language-specific editor passes to one of the multiple language-specific translators 2304 closely bound to the language specific editor and therefore a language tag is not needed. It is noted that as used herein, the term translator is intended to be interpreted broadly to include compilers and interpreters to the extent that such terms have different meanings to those skilled in the art. The output of the script translators 2304 is code executable by a scripting engine 2306.

The output of the translators 2304 is incorporated into the objects with which the scripts are associated. It is noted that the output of the translators does not pass directly from the multiple language-specific translators 2304 to the scripting engine 2306. Instead the objects are stored and remain inactive until being brought onscan. Thereafter, when the objects are executed during a scan cycle (after going onscan), the script is passed to the scripting engine 2306 when the appropriate stages of a scan cycle are executed.

In general, the entire set of instructions within a script are executed during each scan cycle. Two exceptions to this general rule are encountered. First, when the scripting engine 2306 encounters a "pause until confirmation/timeout" instruction. Execution of this instruction comprises the scripting engine 2306 issuing a request to another entity and then pausing execution of the script from which the command issued until a confirmation is received from the recipient of the request. Secondly, a script can be defined asynchronous to the scan of the engine to enable it to perform time consuming operations, such as database access. To prevent indefinite hanging of a script, the script can also specify a period of time (maximum wait period) after which the script is considered to have failed and execution will be terminated. The maximum wait period is typically on the order of many scan cycles running over multiple seconds.

Illustrative embodiments of the present invention and certain variations thereof have been provided in the Figures and accompanying written description. The present invention is not intended to be limited to these embodiments. It will be appreciated by those skilled in the art that a new and useful configuration and development facility including multi-scripting has been described for rendering supervisory process control and manufacturing information applications. In view of the many possible environments to which the principles of this invention may be applied and the flexibility of designing and carrying out software-based systems, it should be recognized that the embodiments described herein are meant to be illustrative and should not be taken as limiting the scope of the invention. Those skilled in the art to which the present invention applies will appreciate that the illustrated embodiments can be modified in arrangement and detail without departing from the spirit of the invention. The present invention is intended to cover the disclosed embodiments as well as others falling within the scope and spirit of the invention to the fullest extent permitted in view of this disclosure and the inventions defined by the claims appended herein below. Therefore, the invention as described herein contemplates all such embodiments as may come within the scope of the following claims and equivalents thereof.

What is claimed is:

1. A supervisory process control and manufacturing information application development and execution system for supporting execution of scripts comprising computer-executable instructions stored on a non-transient computer-readable medium and a processor for executing the stored instructions, the system comprising:
    a script editor interface having a common script editor and at least one language specific editor, the script editor interface facilitating specifying scripts for a plurality of types of objects, and wherein the script editor interface supports multiple distinct user-side script languages,
    the script editor interface generating output including tags indicating a particular one of multiple distinct user-side script languages wherein the tags are applied to at least one of a particular instruction, a particular group of instructions, and an entire script;
    a script translation component including routines for rendering execution-side script of a single execution-side scripting language from source script rendered by the script editor and written according to any of a set of user-side script languages, the set of user-side script languages including at least:
    a first text-based scripting language, and
    a second graphical object-based scripting language, and
    a scripting engine for executing the execution-side script in a run-time environment during each scan cycle of a single execution-side scripting language generated by the script translation component for the first scripting language and the second scripting language.

2. The application development and execution system of claim 1 wherein the script translation component supports designating aliases for referenced attributes, wherein the aliases are selected from an alias table.

3. The application development and execution system of claim 1 wherein the script translation component supports designating attributes using relative identifiers.

4. The application development and execution system of claim 3 wherein the relative identifiers include: an area designation.

5. The application development and execution system of claim 3 wherein the relative identifiers include: an engine designation.

6. The application development and execution system of claim 3 wherein the relative identifiers include: a container designation.

7. The application development and execution system of claim 1 wherein the execution-side scripting language supports pausing a script until at least a next scan cycle while waiting for confirmation of an operation in response to an issued request.

8. The application development and execution system of claim 7 wherein the execution-side scripting language supports terminating the pause a period of time after issuing a request.

9. The application development and execution system of claim 1 wherein the user-side scripts include a script language tag identifying the type of the user-side script language used to generate the source script.

10. The application development and execution system of claim 1 wherein scripts are inserted as customization pre-execution and post-execution instructions within an object.

11. A method for developing and executing supervisory process control and manufacturing information applications including scripts, the method comprising:
    specifying, by a script editor interface, scripts for objects, wherein the script editor interface supports multiple distinct user-side script languages;
    inserting the user-side scripts to customize an object prior to execution of the instructions within the object;
    inserting post-execution user-side scripts to an object;
    rendering, by a script translation component, execution-side script of a single execution-side scripting language from source script rendered by the script editor and written according to any of a set of user-side script languages;
    wherein the user-side script languages comprise a plurality of script languages and wherein the script editor produces output scripts including tags indicating a particular one of plurality of user-side script languages; and executing, by a scripting engine, the execution-side script of the single execution-side scripting language generated by the script translation component during each scan cycle.

12. The method of claim 11 wherein the script translation component supports designating aliases for referenced attributes.

13. The method of claim 11 wherein the script translation component supports designating attributes using relative identifiers.

14. The method of claim 13 wherein the relative identifiers comprise at least one of an area designation, an engine designation, and a container designation.

15. The method of claim 11 wherein the plurality of script languages comprises a first text-based scripting language and a second graphical object-based scripting language.

16. The method of claim 11 wherein scripts are inserted as customization pre-execution and post-execution instructions within an application object.

17. A non-transient computer-readable medium including computer-executable instructions facilitating developing and executing supervisory process control and manufacturing information applications including scripts, the computer-executable instructions facilitating performing the steps of:

specifying, by a script editor interface, scripts for objects, wherein the script editor interface supports multiple distinct user side script languages;

rendering, by a script translation component, execution side script in a single execution side scripting language from source script rendered by the script editor and written according to any of a set of user side script languages, wherein the script editor renders the executing side scripts includes inserting tags indicating a particular one of the set of user-side script languages, the set of user side script languages including at least:

a first text-based scripting language, and a second graphical object-based scripting language; and executing, by a scripting engine, the execution side script of the single execution side scripting language generated by the script translation component for the first text-based scripting language and the second graphical object-based scripting language.

18. The computer-readable medium of claim 17 wherein the user-side script translation component supports designating attributes using relative identifiers.

19. The computer-readable medium of claim 18, wherein the relative identifiers comprise at least one of an area designation, an engine designation, and a container designation.

* * * * *